(12) United States Patent
Shafron

(10) Patent No.: US 7,676,762 B2
(45) Date of Patent: *Mar. 9, 2010

(54) METHOD OF CONTROLLING AN INTERNET BROWSER INTERFACE AND A CONTROLLABLE BROWSER INTERFACE

(75) Inventor: Thomas Shafron, Miami Beach, FL (US)

(73) Assignee: Yahoo! Inc., Sunnyvale, CA (US)

( * ) Notice: Subject to any disclaimer, the term of this patent is extended or adjusted under 35 U.S.C. 154(b) by 750 days.

This patent is subject to a terminal disclaimer.

(21) Appl. No.: 11/362,237

(22) Filed: Feb. 24, 2006

(65) Prior Publication Data

US 2006/0136843 A1 Jun. 22, 2006

Related U.S. Application Data

(63) Continuation of application No. 09/429,585, filed on Oct. 28, 1999, now Pat. No. 7,107,548.

(60) Provisional application No. 60/106,002, filed on Oct. 28, 1998.

(51) Int. Cl.
*G06F 3/00* (2006.01)
(52) U.S. Cl. .................. 715/826; 715/744; 715/760
(58) Field of Classification Search ............. 715/826, 715/733, 744–749, 760, 764, 765, 779, 780, 715/810, 811, 789
See application file for complete search history.

(56) References Cited

U.S. PATENT DOCUMENTS

| | | | |
|---|---|---|---|
| 5,499,335 A | 3/1996 | Silver et al. | |
| 5,630,042 A | 5/1997 | McIntosh et al. | |
| 5,706,502 A | 1/1998 | Foley et al. | |
| 5,744,787 A | 4/1998 | Teicher | |
| 5,764,916 A | 6/1998 | Busey et al. | |
| 5,781,724 A | 7/1998 | Nevarez et al. | |
| 5,784,058 A | 7/1998 | LaStrange et al. | |
| 5,796,393 A | 8/1998 | MacNaughton et al. | |
| 5,802,530 A | 9/1998 | Van Hoff | |
| 5,805,803 A | 9/1998 | Birrell et al. | |

(Continued)

FOREIGN PATENT DOCUMENTS

WO WO 00/25239 5/2000

(Continued)

OTHER PUBLICATIONS

Alexa Internet Website. Archived Feb. 9, 1998 at http://web.archive.org.

(Continued)

*Primary Examiner*—Dennis Bonshock
(74) *Attorney, Agent, or Firm*—James J. DeCarlo; Greenberg Traurig, LLP

(57) ABSTRACT

The present invention is directed to a method of dynamically controlling and displaying an Internet browser interface, and to a dynamically controllable Internet browser interface. In accordance with the present invention, a browser interface may be customized using a controlling software program that may be provided by an Internet content provider, an ISP, or that may reside on an Internet user's computer. The controlling software program enables the Internet user, the content provider, or the ISP to customize and control the information and/or functionality of a user's browser and browser interface.

49 Claims, 11 Drawing Sheets

U.S. PATENT DOCUMENTS

| | | |
|---|---|---|
| 5,813,007 A | 9/1998 | Nielsen |
| 5,835,914 A | 11/1998 | Brim |
| 5,848,424 A | 12/1998 | Scheinkman et al. |
| 5,875,296 A | 2/1999 | Shi et al. |
| 5,877,759 A | 3/1999 | Bauer |
| 5,883,810 A | 3/1999 | Franklin et al. |
| 5,890,172 A | 3/1999 | Borman et al. |
| 5,914,714 A | 6/1999 | Brown |
| 5,917,491 A | 6/1999 | Bauersfeld |
| 5,918,214 A | 6/1999 | Perkowski |
| 5,933,142 A | 8/1999 | LaStrange et al. |
| 5,949,419 A | 9/1999 | Domine et al. |
| 5,963,952 A | 10/1999 | Smith |
| 5,964,836 A | 10/1999 | Rowe |
| 5,974,446 A | 10/1999 | Sonnenreich et al. |
| 5,999,179 A | 12/1999 | Kekic et al. |
| 5,999,972 A | 12/1999 | Gish |
| 5,999,973 A | 12/1999 | Glitho et al. |
| 6,000,832 A | 12/1999 | Franklin et al. |
| 6,006,034 A | 12/1999 | Heath et al. |
| 6,009,459 A | 12/1999 | Belfiore et al. |
| 6,011,537 A | 1/2000 | Slotznick |
| 6,020,884 A | 2/2000 | MacNaughton et al. |
| 6,025,836 A | 2/2000 | McBride |
| 6,026,435 A | 2/2000 | Enomoto et al. |
| 6,034,683 A | 3/2000 | Mansour et al. |
| 6,041,360 A | 3/2000 | Himmel et al. |
| 6,057,836 A | 5/2000 | Kavalam et al. |
| 6,061,695 A | 5/2000 | Slivka et al. |
| 6,072,486 A | 6/2000 | Sheldon et al. |
| 6,101,486 A | 8/2000 | Roberts et al. |
| 6,112,240 A | 8/2000 | Pogue et al. |
| 6,115,040 A | 9/2000 | Bladow et al. |
| 6,119,098 A | 9/2000 | Guyot et al. |
| 6,125,352 A | 9/2000 | Franklin et al. |
| 6,141,010 A | 10/2000 | Hoyle |
| 6,175,869 B1 | 1/2001 | Ahuja et al. |
| 6,185,600 B1 | 2/2001 | Spence et al. |
| 6,188,995 B1 | 2/2001 | Garst et al. |
| 6,208,995 B1 | 3/2001 | Himmel et al. |
| 6,216,153 B1 | 4/2001 | Vortriede |
| 6,226,655 B1 * | 5/2001 | Borman et al. ............... 715/207 |
| 6,226,752 B1 | 5/2001 | Gupta et al. |
| 6,232,972 B1 | 5/2001 | Arcuri et al. |
| 6,256,668 B1 | 7/2001 | Slivka et al. |
| 6,262,731 B1 | 7/2001 | Hasegawa |
| 6,266,058 B1 | 7/2001 | Meyer |
| 6,282,548 B1 | 8/2001 | Burner et al. |
| 6,286,001 B1 | 9/2001 | Walker et al. |
| 6,292,185 B1 | 9/2001 | Ko et al. |
| 6,314,451 B1 | 11/2001 | Landsman et al. |
| 6,360,255 B1 | 3/2002 | McCormack et al. |
| 6,373,507 B1 | 4/2002 | Camara et al. |
| 6,385,619 B1 | 5/2002 | Eichstaedt et al. |
| 6,407,754 B1 | 6/2002 | Hetherington et al. |
| 6,418,432 B1 * | 7/2002 | Cohen et al. .................... 707/5 |
| 6,433,800 B1 | 8/2002 | Holtz |
| 6,434,563 B1 | 8/2002 | Pasquali et al. |
| 6,460,058 B2 | 10/2002 | Kopulu et al. |
| 6,469,713 B2 | 10/2002 | Hetherington et al. |
| 6,476,833 B1 | 11/2002 | Moshfeghi |
| 6,483,525 B1 | 11/2002 | Tange |
| 6,486,892 B1 | 11/2002 | Stern |
| 6,490,602 B1 | 12/2002 | Kraemer |
| 6,493,000 B1 | 12/2002 | Wynn et al. |
| 6,496,203 B1 | 12/2002 | Beaumont et al. |
| 6,496,936 B1 | 12/2002 | French et al. |
| 6,505,238 B1 | 1/2003 | Tran |
| 6,542,897 B2 | 4/2003 | Lee |
| 6,549,217 B1 | 4/2003 | De Greef et al. |
| 6,584,505 B1 | 6/2003 | Howard et al. |
| 6,624,831 B1 | 9/2003 | Shahine et al. |
| 6,651,217 B1 | 11/2003 | Kennedy et al. |
| 6,686,938 B1 | 2/2004 | Jobs et al. |
| 6,704,031 B1 | 3/2004 | Kimball et al. |
| 6,748,367 B1 | 6/2004 | Lee |
| 6,789,201 B2 | 9/2004 | Barton et al. |
| 6,819,343 B1 | 11/2004 | Sobeski et al. |
| 6,851,060 B1 | 2/2005 | Shrader |
| 6,865,680 B1 | 3/2005 | Wu et al. |
| 6,868,394 B1 | 3/2005 | Mele |
| 6,873,974 B1 | 3/2005 | Schutzer |
| 2001/0001147 A1 | 5/2001 | Hutchison et al. |
| 2001/0035885 A1 | 11/2001 | Iron et al. |
| 2002/0018078 A1 | 2/2002 | Khan et al. |
| 2002/0057299 A1 | 5/2002 | Oren et al. |
| 2002/0062342 A1 | 5/2002 | Sidles |
| 2002/0070963 A1 | 6/2002 | Odero et al. |
| 2002/0070969 A1 | 6/2002 | Barksdale et al. |
| 2002/0075326 A1 | 6/2002 | Allen |
| 2002/0077978 A1 | 6/2002 | O'Leary et al. |
| 2002/0078095 A1 | 6/2002 | Culham |
| 2002/0089549 A1 | 7/2002 | Munro et al. |
| 2002/0097277 A1 | 7/2002 | Pitroda |
| 2002/0149615 A1 | 10/2002 | Rajarajan et al. |
| 2002/0149618 A1 | 10/2002 | Estrada et al. |
| 2002/0154159 A1 | 10/2002 | Day et al. |
| 2002/0158912 A1 | 10/2002 | O'Rouke |
| 2002/0163544 A1 | 11/2002 | Baker et al. |
| 2002/0163545 A1 | 11/2002 | Hii |
| 2002/0186239 A1 | 12/2002 | Komuro |
| 2002/0186249 A1 | 12/2002 | Lu et al. |
| 2002/0186255 A1 | 12/2002 | Shafron et al. |
| 2002/0186256 A1 | 12/2002 | Hong |
| 2003/0009768 A1 | 1/2003 | Moir |
| 2003/0011641 A1 | 1/2003 | Totman et al. |
| 2003/0028764 A1 | 2/2003 | Campbell |
| 2003/0067481 A1 | 4/2003 | Chedgey et al. |
| 2003/0080995 A1 | 5/2003 | Tenenbaum et al. |
| 2003/0085916 A1 | 5/2003 | Thiry et al. |
| 2003/0085927 A1 | 5/2003 | Muller |
| 2003/0112271 A1 | 6/2003 | Batalden et al. |
| 2003/0112280 A1 | 6/2003 | Driskell |
| 2003/0128233 A1 | 7/2003 | Kasriel |
| 2003/0131106 A1 | 7/2003 | Kasriel |
| 2003/0202009 A1 | 10/2003 | Kasriel |
| 2004/0061720 A1 | 4/2004 | Weber |
| 2004/0125130 A1 | 7/2004 | Flamini et al. |
| 2004/0174396 A1 | 9/2004 | Jobs et al. |
| 2004/0186775 A1 | 9/2004 | Margiloff et al. |
| 2004/0243520 A1 | 12/2004 | Bishop et al. |
| 2005/0039141 A1 | 2/2005 | Burke et al. |
| 2005/0039144 A1 | 2/2005 | Wada et al. |
| 2005/0198220 A1 | 9/2005 | Wada et al. |

FOREIGN PATENT DOCUMENTS

| | | |
|---|---|---|
| WO | WO 00/31657 A2 | 6/2000 |
| WO | WO 01/39046 A1 | 5/2001 |
| WO | WO 01/67285 A2 | 9/2001 |
| WO | WO 01/95104 | 12/2001 |
| WO | WO 03/038554 | 5/2003 |
| WO | WO 03/038640 | 5/2003 |
| WO | WO 2005/017670 A2 | 2/2005 |
| WO | WO 2005/019983 A2 | 3/2005 |
| WO | WO 2005/043355 A2 | 5/2005 |

OTHER PUBLICATIONS

Eric Ladd and Jim O'Donnell, Using Microsoft Internet Explorer 4 Que Corporation. 1997 pp. 42-43.

TruPin, "The Visual Programmer puts Active X Document Objects Through Their Paces", Microsoft Systems Journal, Jun. 1996, v11, n6, p. 55(16).

"Client/Server and Host Application Development Tools", DBMS, Jun. 15, 1996, v9, n6 p. 27(10).
Childers, "Delphi Client/Server Suite", Sep. 10, 1996, PC Magazine, vol. 15, N1, p. 207 (3).
Persky, "HTML goes WYS/WYG: Two Mac-based Editors", Mar. 1997, LAN Magazine, v12, n3, p. 121(5).
Evans, "Extend Client/Server Apps to the Web", Mar. 1997, Databased Advisor, v15, n3, p. 52 (5).
Finn, "Add Control to your Intranet", Aug. 1997, Databased Web Advisor, v15, n8, p. 56(3).
Wong, "Meeting on the Internet in 10 Minutes", Nov. 1997, Network, v12, n12, p. 131(4).
Faison, "The New HTML Help System Extends Online Help From the Desktop to the Web", Jan. 1998, Microsoft Systems Journal, v13, n1, p. 55 (14).
Alwang "Meeting of the Minds", Feb. 24, 1998, PC Magazine, v17, n4, p. 179(10).
Walter, "Acrobat 4: Adobe's Bid to Make it More that Just a Viewer", Mar. 1999, Seybold Report on Internet Publishing, 3, 7, NA(1).
Alex Lash, "Alexa Accessorizes Browsers", Sep. 22, 1997, CNET News.com. 2 pages.
"As Go Surfers, So Goes Alexa". Jul. 24, 1997, Wired News, 2 pages.
Bart Eisenberg, "Alexa Archives the Internet", Copyright 1997, 5 pages.
Jesse Berst, "A Must-See Browser Add-On".Sep. 16, 1998, ZDNet AncorDesk, 3 pages.
International Search Report for International Application No. PCT/US99/25332, Feb. 2, 2000.
International Search Report for International Application No. PCT/US02/34509, Oct 28, 2003.
International Search Report for International Application No. PCT/US02/34510, Jan. 31, 2003.
Written Opinion for International Application No. PCT/US02/34510, Sep. 26, 2003.
International Search Report for International Application No. PCT/US01/16993, Oct. 25, 2001.
International Preliminary Examination Report for International Application No. PCT/US01/16993, Mar. 5, 2003.
International Preliminary Examination Report for International Application No. PCT/US99/25332, Jul. 29, 2002.
Mace, Thomas, "PowerBrowser", Mar. 12, 1996, PC Magazine, vol. 15, No. 5, p. 132(1).
Mendelson, Edward, "Wake Up Your Web Site", Jun. 9, 1998, PC Magazine, vol. 17, No. 11 p. 60(2).
"Band Objects", Microsoft Corporation, Copyright 1997, pp. 1-6.
"Browser Extensions", MSDN, Copyright 2004, pp. 1-2.
Creating Custom Explorer Bars, Tool Bands, and Desk Bands, MSDN, Copyright 2004, pp. 1-11.
"Developers Get Early IE 5", Jun. 11, 1998, Wired News, pp. 1-2.
"Introduction",XUL Programmer's Reference Manual, Last Updated: Apr. 5, 2001, pp. 1-3.
"Netscape 6 Preview Release 1", NT Compatible, Apr. 5, 2000, pp. 1-3.
"Plug-in-Guide", DevEdge Oline Documentation, Chapter 1, pp. 1-4 and 1-15.
"Subject: Add toolbar to IE4-taskbar", Google Groups, Jan. 26, 1999, p. 1.
"Subject: Adding Toolbar (Plugin) in Netscape Communicator", Google Groups, May 18, 2000, pp. 1-4.
"Subject: Custom Toolbar for Netscape Browser", Google Groups, May 15, 2001, p. 1.
"Subject: How the Hell????", Google Groups, Jun. 6, 2000, pp. 1-3.
"Subject: How to add toolbar like Yahoo companion in IE", Google Groups, Sep. 30, 1999, Messages 1-10.
"Subject: How to add toolbar like Yahoo companion in IE", Google Groups, Sep. 30, 1999, Messages 11-14.
"Subject: IE4 Band Objects", Google Groups, Mar. 22, 1998, pp. 1-3.
"Subject: Plugins for IE", Google Groups, Sep. 30, 2000, p. 1.
"Subject: Toolbar like IE4", Google Groups, Apr. 23, 1998, pp. 1-2.
"Subject: What's the deal with Yahoo Companion? Standard plugin API or not?", Google Groups, Jan. 12, 2000, pp. 1-6.
Flanagan David, "Netscape 6.0 Released", O'Reilly, Nov. 16, 2000, pp. 1-3.
Galli Marcio, "The DevEdge RSS-News Ticker Toolbar", Netscape DevEdge, Jul. 14, 2003, pp. 1-3.
Jimmy, "Netscape 6.0 Preview Release 2 Review-Good Software, Bad Timing", Jimmy's World, Aug. 9, 2000, 3 pages.
Mann Alex and Hecht Kevin, "DevEdge Newsgroup FAQ: Client Technical", DevEdge Online Archive, Last Updated: Dec. 15, 1998, pp. 1-12.
Roberts Scott, "Programming Microsoft Internet Explorer 5", Jul. 1999, pp. 3-16,383-423, 461-475, Microsoft Press, USA.
Summers Jason, "Plug-ins Newsgroup FAQ: Plug-ins", DevEdge Online Archive, Last Updated: May 26, 1999, pp. 1-16.
Alexa, Alexa Toolbar Version 1.4.1, Copyright 1998[Note: Setup File Available on Enclosed CD Entitled "Alexa Setup".
International Preliminary Examination Report for International Application No. PCT/US02/34509, May 11, 2004.
International Preliminary Examination Report for International Application No. PCT/US02/34510, Aug. 12, 2004.
International Search Report for International Application No. PCT/US04/24397, Oct. 31, 2005.
Written Opinion for International Application No. PCT/US04/24397, Oct. 31, 2005.
International Preliminary Report on Patentability for International Application No. PCT/US2004/24397, Feb. 13, 2006.
Hauser, "Generic Extensions of WWW Browsers", First USENIX Workshop on Electronic Commerce, p. 147-154, Aug. 10, 1995.
U.S. Appl. No. 11/347,700, filed Nov. 25, 2008; Office Action.
U.S. Appl. No. 11/347,150, filed Sep. 18, 2008; Office Action.
U.S. Appl. No. 11/347,149, filed Oct. 15, 2008; Office Action.

* cited by examiner

METHOD OF CONTROLLING AN INTERNET BROWSER INTERFACE AND A CONTROLLABLE BROWSER INTERFACE

FIELD OF THE INVENTION

The present invention is directed to computer display interfaces and, more particularly, to a method of dynamically controlling an Internet browser interface and a dynamically controllable browser interface.

BACKGROUND OF THE INVENTION

When accessing the Internet (i.e., the worldwide web, the web, etc.), an Internet user typically executes, via a computer, a browser software program such as, for example, Netscape Navigator™ or Microsoft Internet Explorer™. The browser program (i.e., a browser) establishes a physical link to the Internet (via a modem and an Internet Service Provider (ISP), for example) and also provides a textual and graphical user interface, i.e., a browser interface, having a predetermined look and functionality, neither of which can currently be significantly changed by the Internet user. Thus, the browser interface remains relatively static as the Internet user navigates the Internet and moves from application to application or HTML (Hyper-text Mark-up Language) page to HTML page.

Limited control of the browser interface is currently available via an executable software program that may, for example, add functional buttons to the interface. However, the additional functionality is added to the browser interface when the browser is initially activated and remains static thereafter. Thus, it is not possible for a browser displaying a browser interface modified as just-described to dynamically download information from an Internet site and customize itself, either when the browser is initiated or as the users traverses the Internet. Such a modified browser interface also does not provide access to the various browser Application Programming Interfaces (APIs) for Plug-ins and interfaces.

The proliferation of Internet sites makes it increasingly difficult for content providers (i.e., owners of Internet sites) to maximize the time an Internet user spends at a particular Internet site. It is, of course, desirable for a content provider to be able to maximize that time an Internet user spends at that provider's Internet site, or to ensure that an Internet user returns to the content provider's site; this being generally referred to in the art as stickiness. It is also desirable to maximize the number of Internet users accessing a content provider's site. Briefly stated, an Internet content provider wants to attract a maximum number of Internet users to that provider's Internet site, and to maximize the amount of time those Internet users remain at that site; neither of which is possible using current Internet browsers.

SUMMARY OF THE INVENTION

The present invention is directed to a method of dynamically controlling an Internet browser interface and to a dynamically controllable browser interface. The present invention is also directed to a method of increasing the number of times an Internet user accesses a predetermined Internet site, and to a method of increasing the amount of time an Internet user spends at a predetermined Internet site.

As used herein, the term controlling and controllable refer to, by way of non-limiting example, adding to, removing from, and modifying an Internet browser interface. An Internet browser interface, as referred to herein, means the visual or aural presentation presented to a browser user, and via which a user interacts with the browser. The term customize (and variations thereof) may also be used herein to describe the controllability provided in accordance with the present invention. As used herein, the term dynamically controlling (and variations thereof) refers to a method by which a part of an Internet browser interface (i.e., an interface object) may be displayed and periodically changed or updated while a browser displaying the interface object is activated.

A browser, as used herein, is given its general, art recognized meaning, and generally refers to a software program that provides an interface to the World Wide Web or Internet. The browser enables an Internet user to navigate the Internet and establish a connection to various Internet sites and view the web page(s) provided at the various Internet sites by content providers. A browser is specifically capable of calling, i.e. loading onto the Internet user's computer, an ActiveX control or Plug-in via an Internet site. The browser also enables an Internet user to navigate between and among Internet sites, i.e., to surf the web. The browser provides a browser interface to the Internet user that is formatted by the provider of the browser software program. The browser interface typically defines the layout (e.g., color, size, number and location) and functionality provided by the browser to the Internet user. The browser interface may comprise a first parent window that typically defines the general size, color, and layout of the browser interface and includes window control buttons (e.g., minimize, close, etc.). The browser interface may also comprise a second parent window (a child to the first parent window), and one or more windows dependent from the second parent (i.e., children). The second parent and its dependent windows may provide, for example, various information (e.g., advertisements, coupons, news, HTML links, etc.) and functionality (i.e., toolbars, pull-down menus, Plug-ins, applications, etc.) to the Internet user.

An ActiveX control, as used herein, refers to a tool for linking desktop applications for the Internet and is based on art recognized, Microsoft-developed specifications. A Plug-in, as used herein, refers to a type of program developed for use with Netscape browsers and that integrates with a larger application (e.g., a browser software program) to add a specific functionality or capability to that larger program. An ActiveX control and a Plug-in as described above and as referred to herein may be used with any Internet browser.

As used herein, the term Internet site refers to a location (i.e., node) on the Internet defined by an Internet address or URL (uniform or universal resource locator). As used herein, the term Internet web page refers to a collection of hypertext markup language (HTML) commands provided at an Internet site and that provide formatting information for the text, graphics, and functionality to create a hypertext document that may be displayed on an Internet user's computer display via a browser. For example, an Internet user enters a URL to establish a connection to an Internet site, and that Internet site provides HTML commands to the user's browser to enable display of that Internet site's web page on the user's computer display. The browser interprets hypertext markup language (HTML) commands embedded in a web page and uses the HTML commands to format the text and graphics for that web page.

The present invention provides advantages to an Internet user, an Internet content provider (i.e., an owner of an Internet site), and to an Internet Service Provider (ISP). For an Internet user, the present invention provides a method of dynamically controlling or customizing that user's Internet browser interface. The Internet user may now customize the browser interface so that each time the user accesses the Internet using a browser, user-defined information and/or functionality (also collectively referred to herein as information) will be displayed with the browser interface. For example, the user may include bookmarks, address and phone books, personal financial information, personalized news, and various functionality such as is available via ActiveX control and Plug-ins.

In addition, if an Internet user has an account with a content provider, that user's specific account information (e.g., investment portfolio, news headlines, bookmarks, address book, etc.) may now be dynamically displayed with the browser interface by the browser. Currently, an Internet user can only access that user's specific account information while connected to the content provider's Internet site. The user must return to the content provider's site to receive updated account information. The account information is not displayed with the browser interface once user leaves that Internet site. The present invention provides a method of dynamically controlling and a dynamically controllable browser interface that enables an Internet user to display with the browser interface and continuously update information and/or functionality specific to that user.

For a content provider, the present invention ensures that an Internet user (via a browser) automatically establishes a connection to that content provider's Internet site every time that user accesses the Internet using a browser. Thus, as soon as an Internet user causes a browser to execute (by selecting a browser icon, for example), the browser automatically establishes a connection to the content provider's Internet site to load that user's customized browser interface information. The present invention may also periodically and automatically cause the user's browser to connect to the content provider's Internet site while the browser is active, i.e. while the user surfs the web. In one embodiment, the content provider may provide an Internet user with access to a program for controlling the browser interface. Once the Internet user has accessed that controlling program to customize that user's browser interface, a connection to that content provider may be automatically established by that user's browser every time that user accesses the Internet. Thus, and in contrast to currently available browsers which establish a connection to an Internet site only when the user enters a URL (or otherwise positively acts to cause a connection to be established such as, for example, by selecting a link or banner advertisement), the present invention automatically establishes a connection to the content provider when the browser is initiated, independent of any home web page selection pre-programmed into the browser, whether by the Internet user or browser vendor. Once that initial connection is established, the content provider may load user-specific information and/or functionality to the Internet user's computer for display with that user's browser interface.

In addition, the content provider can also periodically cause the browser to automatically reconnect to that content provider's Internet site to update, download new, or otherwise communicate information and/or functionality for the Internet user's browser interface. For example, if an Internet user subscribes to an email service of the content provider, email messages for that Internet user received by the content provide may be automatically communicated to the Internet user even though the user is "surfing" elsewhere. When the user's browser initially establishes a connection to the content provider's Internet site upon execution of that user's browser, the information communicated by the content provider to the Internet user includes instructions for the browser to periodically reconnect to the content provider's Internet site. Thus, regardless of the number of Internet sites the user accesses, and regardless of the particular Internet site currently accessed by a user, a connection back to the content provider's Internet site will be automatically established at intervals determined by the content provider; those reconnections being transparent to the Internet user except when the user receives a notification from the content provider (i.e., new mail has arrived). Thus, the browser interface may be dynamically controlled as the Internet user surfs the web. For an ISP, the benefits are at least as great as for a content provider.

Initially, the browser interface for an Internet user must be customized using a software program that may be provided by the content provider or ISP, or that may be available on the user's computer. The software program, referred to hereinafter as a controlling program or a program for controlling (and other variations thereof), changes the manner in which the user's browser functions. More specifically, the controlling program downloads or creates a library file on the Internet user's computer. The library file may be, for example, a Dynamic Link Library (DLL) (for a Windows operating system) that creates a shell (or plurality of shells) within the browser and within which various information and/or functionality may be loaded as an ActiveX control or Plug-in. The library file includes ActiveX control or Plug-in functionality that defines an interface object added to the browser interface in accordance with the present invention. When an Internet user activates a browser, the library file is opened and the ActiveX control or Plug-in code contained within that file is made available to the browser and incorporated into the browser interface, thus causing the interface object to be displayed with the browser interface. The library file, and consequently, the shell (or shells), remain open as long as the browser is activated, generally as long as the user is surfing the web. Thus, the information and/or functionality for customizing the browser interface and loaded in the shell remain active even as the user moves from Internet site to Internet site. When used in this context herein, the terms information and functionality refer to any information, data, and/or software-driven functionality that can be contained in or part of the library file.

The library file also causes the browser to establish a connection to the content provider's Internet site when the browser is initially activated by the user. The content provider's Internet site will load information and/or functionality for the interface object to the user's computer for use in the browser and for display in the browser interface. The information and/or functionality loaded by the content provider may be specific to an Internet user if, for example, that user has an account with the content provider. Alternatively, the content provider may load general information and/or functionality if, for example, the Internet user does not have an account with the content provider (i.e., is a guest).

The present invention uses an object linking and embedding (OLE) in-process server to control the information and/or functionality of a browser interface. Using an ActiveX control or a browser Plug-in (each being referred to herein as a browser interface overlay (BIO) Library) contained in a library file, virtually any information and/or functionality available with an ActiveX control or Plug-in may be added to a browser interface using the present invention. The library file (via the BIO Library) thus includes the code required to customize, i.e., add, remove and/or modify, the browser interface.

Once an Internet user has accessed the controlling program and customized the operation of that user's browser, the customized browser interface is displayed when the browser is activated. In contrast to prior art browser modification methods, the present invention provides a method and browser interface that may be dynamically controlled. Updated or changed information and/or functionality may be communicated to the browser and displayed in the browser interface as the Internet user surfs the web and while maintaining the customized information and/or functionality of the browser interface. Thus, an Internet user may automatically receive up-to-date information such as, for example, stock quotes, email, new headlines, at that user's browser interface, at any Internet site and as long as the user is surfing the web using the browser.

Other objects and features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims.

BRIEF DESCRIPTION OF THE DRAWINGS

In the drawing figures, which are merely illustrative, and wherein like reference characters denote similar elements throughout the several views.

DETAILED DESCRIPTION OF THE PRESENTLY PREFERRED EMBODIMENTS

The present invention is directed to a method of controlling and displaying an Internet browser interface, and to a controllable Internet browser interface. In accordance with the present invention, a browser interface may be customized using a controlling software program that may be provided by an Internet content provider, an ISP, or that may reside on an Internet user's computer. The controlling software program enables the Internet user, the content provider, or the ISP to customize and control the information and/or functionality of a user's browser and browser interface.

Figure 10:
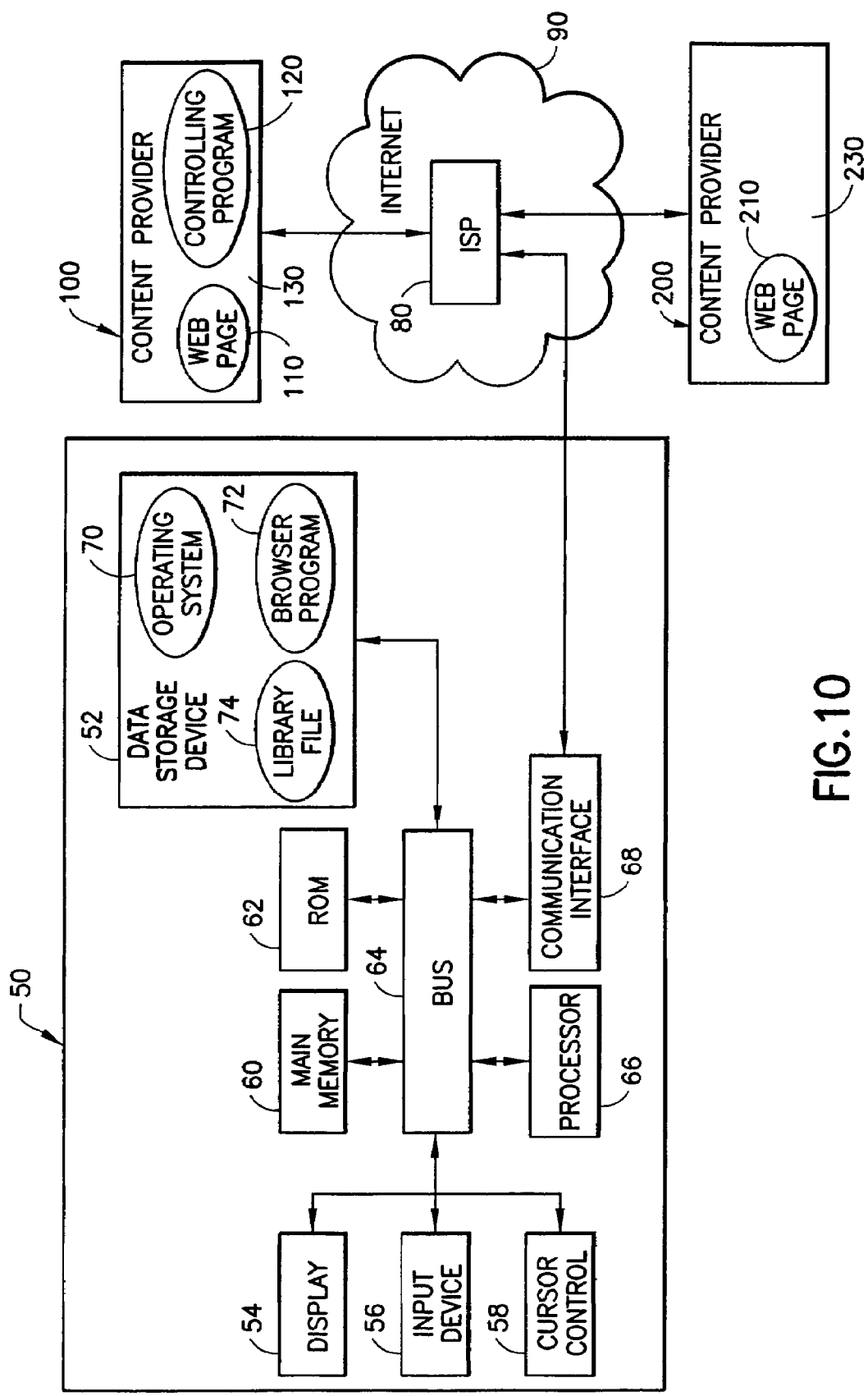
FIG. 10 is a schematic block diagram of a computer connected to the Internet and upon which the present invention may be implemented.

Referring now to the drawings in detail, FIG. 10 is a block diagram of a computer 50 connected to the Internet 90 and upon which the present invention may be implemented. Computer 50 includes an internal bus 64 that facilitates communication of information (i.e., digital data) between and among the various devices of the computer 50 and that also facilitates communication between the computer and external devices and systems via a communication interface 68. A processor 66 coupled to the bus 64 process information within the computer 50. The computer 50 also includes a main memory 60 such as, for example, Random Access Memory (RAM) or other equivalent dynamic memory storage device, coupled to bus 64 for receiving and storing instructions communicated from the processor 66. Main memory 60 may also be used to temporarily store variable or other intermediate information while the processor 66 executes instructions. Read-Only-Memory (ROM) 62 is also coupled to the bus 64 for storing static data and instructions for use by the processor 66. Various input and output devices are provided as part of the computer 50, including, by way of non-limiting example, a display 54 (e.g., cathode ray tube (CRT), liquid crystal display (LCD), etc.), an input device 56 such as a keyboard, and a cursor control device 58 such as a mouse, or trackball, for example. A data storage device 52 such as, for example, a magnetic disk drive and magnetic disk, a CD-ROM drive and CD-ROM, or other equivalent devices and data storage mediums, is coupled to the bus 64 for communication with the processor 66, main memory 60, and communication interface 68. The storage device 52 preferably has an operating system 70 and an Internet browser software program 72 (i.e., a browser) stored thereon. As will be discussed in greater detail below, a library file 74 may also be stored on the data storage device 52.

The computer 50 may connect to the Internet 90 via the communication interface 68 over a transmission media including, but not limited to, coaxial cable, copper wires, and fiber optical cables. Communication between the computer 50 and the Internet 90 may also be via a wireless or cellular interface. The communication interface 68 facilitates two-way communication between the computer 50 and another electronic device or system, e.g., a server computer (not shown) provided by a content provider 100, 200.

An Internet user (not shown) using the computer 50 may gain access to the Internet 90 by causing the browser 72 to execute, thereby opening a communication link between the communication interface 68 of the computer 50 and an Internet site 130 of a content provider 100, via an Internet Service Provider (ISP) 80. The browser 72 provides, to the computer display 54, a browser interface 20 (see, e.g., FIG. 1) having a layout (e.g., color, size, number, location) and functionality of windows 30 that is predetermined in the browser 72 by the browser vendor. Internet content is communicated by the content provider 100 to the computer 50 for display in a content window 32 of the browser interface 20.

In accordance with an embodiment of the present invention, a first Internet content provider 100 may provide an Internet user with access to a program 120 for controlling the browser 72 and browser interface 20. When executed by the user, the controlling program 120 downloads or creates a library file 74 such as, for example, a Dynamic Link Library (DLL), on the data storage device 52 of the Internet user's computer 50. The library file 74 preferably includes ActiveX control or Plug-in functionality. Thereafter, when the Internet user accesses the Internet using the browser 72, the browser 72 opens the library file 74 and preferably automatically establishes a connection to the content provider's Internet site 130. The content provider, in response to the connection established by the browser 72, loads information and/or functional data into a shell operating within the browser and created by the library file 74. For example, if the user has an account with the content provider 100, customized information and/or functionality may be loaded into the library file 74. If the user does not have an account, more generalized (i.e., guest) information and/or functionality may be loaded.

The library file 74 essentially opens a shell (or a plurality of shells) within the browser 72 that contains the ActiveX control or Plug-in code that may control, i.e., add, remove, and/or modify, the Internet browser 72 and the browser interface 20. When loaded with the ActiveX control or Plug-in, the library file 74 preferably contains functions, objects, data, and other software, referred to generally herein as information, that may be used to control the browser 74 and browser interface 20. The present invention ensures that the library file 74 (and shell) does not close when the Internet user moves from Internet site 130 to Internet site 230. Thus, the information and/or functionality provided via the ActiveX control or Plug-in is not lost when the Internet user disconnects from the Internet site that loaded the ActiveX control or Plug-in, and connects to another Internet site.

Figure 1:
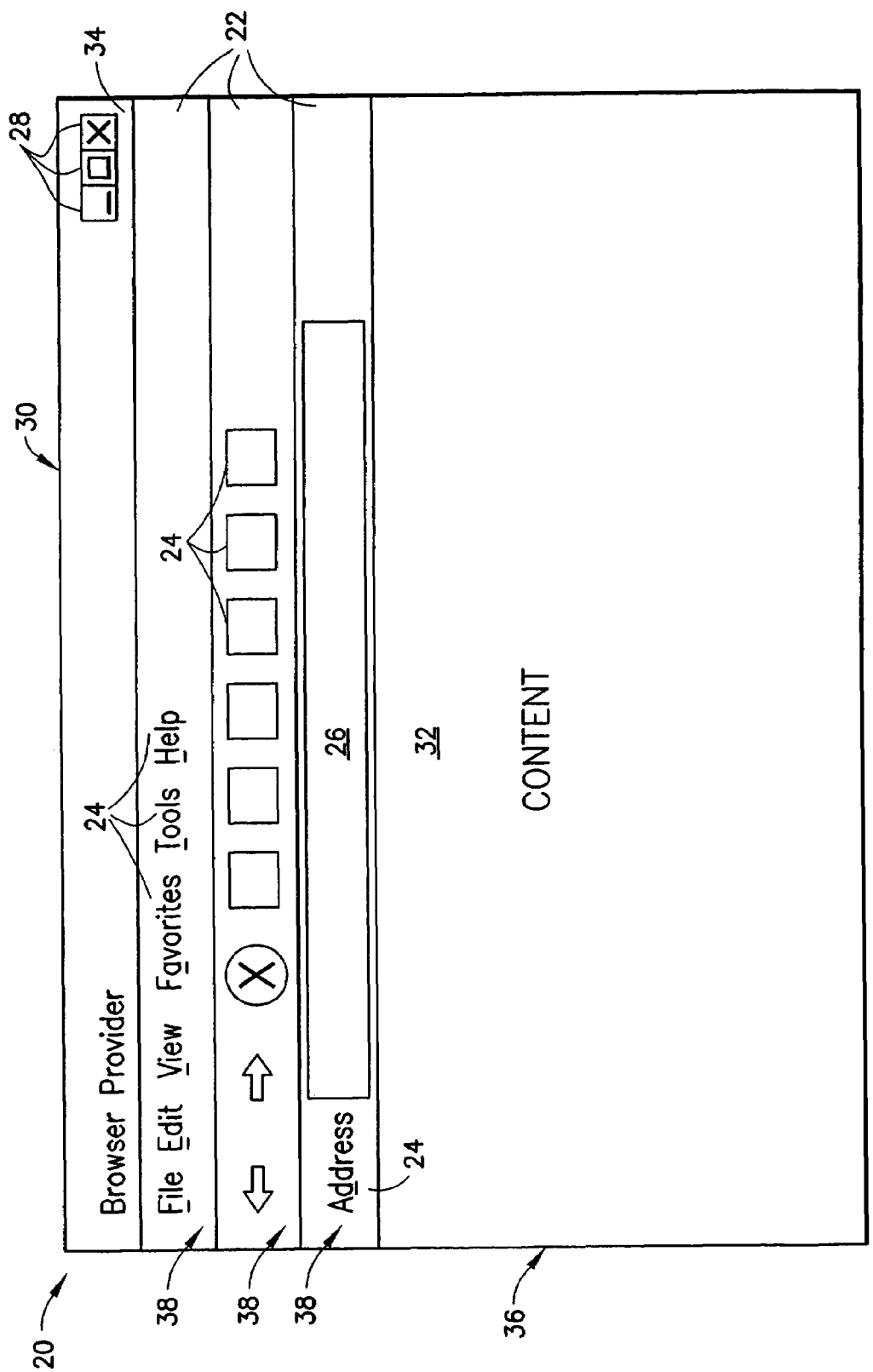
FIG. 1 depicts a view of a prior art Internet browser interface.

Referring next to FIG. 1, a prior art Internet browser interface 20 having a plurality of windows, each providing various functionality to the Internet user, is there depicted. The browser interface 20 may comprise a first parent window 30 that typically defines the general size, color, and layout of the browser interface and includes window control buttons 28 (e.g., minimize, close, etc.) for that window 30. The browser interface 20 may also comprise a second parent window 36 (a child to the first parent window) within the first parent window 30, and one or more child windows 38 dependent from the second parent. The second parent window 36 and child windows 38 typically define information and/or functionality that will assist an Internet user when accessing and navigating the Internet. For example, the second parent 36 and its dependent windows 38 may provide toolbars, pull-down menus, Plug-ins, applications, etc.

For example, three windows 38 provided at the top (in the drawing) of the interface 20 define three toolbars 22, which may include a variety of interface controls 24 such as, for example, pull-down menus, functional buttons (e.g., stop, back, forward, home, etc.), and a combination of functional buttons and windows (e.g., a search button and window). The uppermost toolbar 22 provides a plurality of pull-down menus 24; the middle toolbar 22 provides a plurality of functional buttons 24; and the lowermost toolbar 22 provides a pull-down menu and a window 26 (a URL address window). A content window 32 is also provided as part of the interface 20 within which content from an Internet content provider 100 (see, e.g., FIG. 10) may be displayed. The Internet user may toggle any of the lower three (in the drawing) toolbars 22 on and off using a View toolbar object 24 (pull-down menu) provided in the second toolbar 22. However, the Internet user currently may not add, remove, or otherwise modify the browser interface 20.

Figure 2:
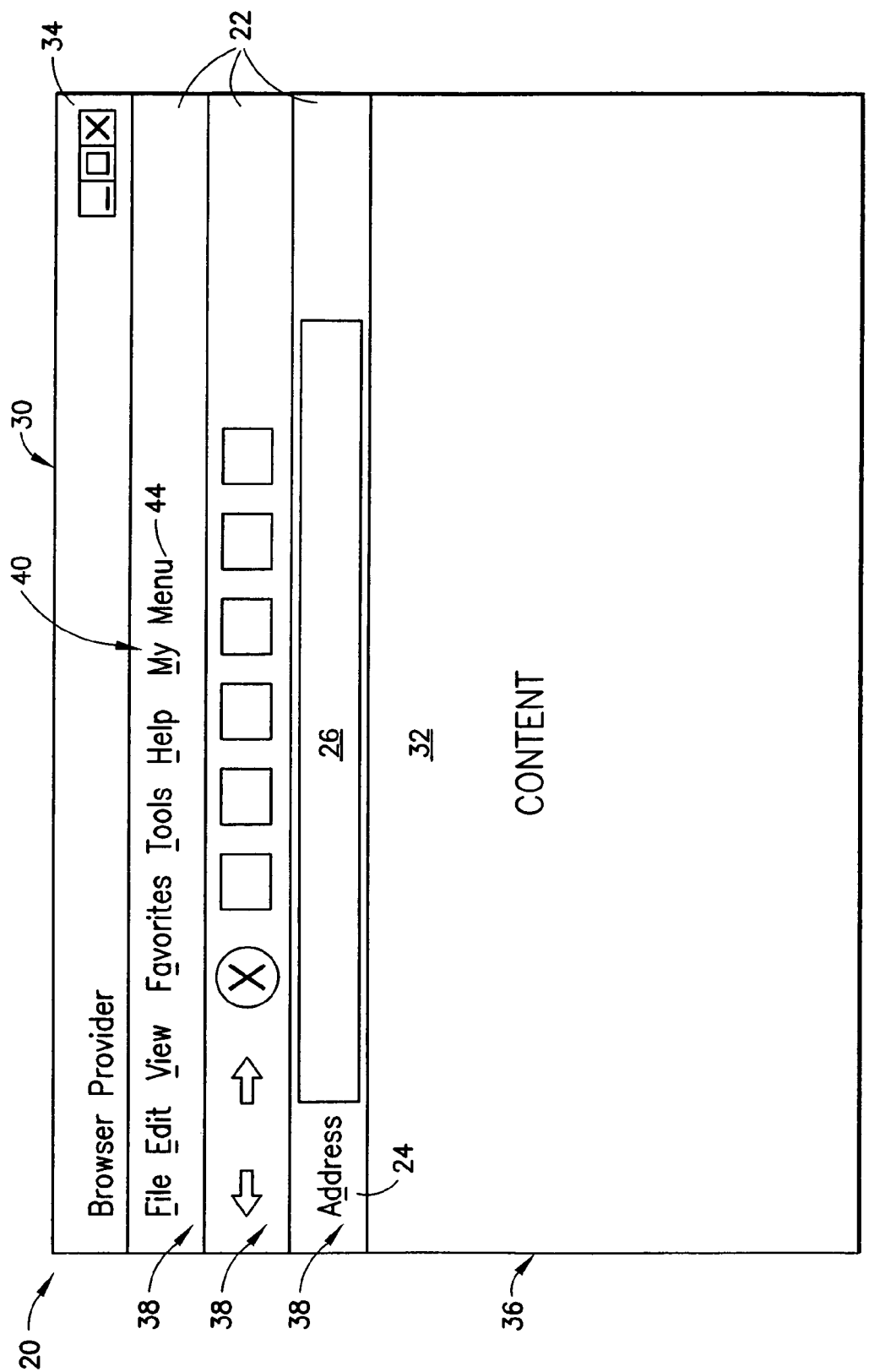
FIG. 2 depicts a view of an Internet browser interface including an interface object in the browser toolbar in accordance with an embodiment of the present invention.
Figure 3:
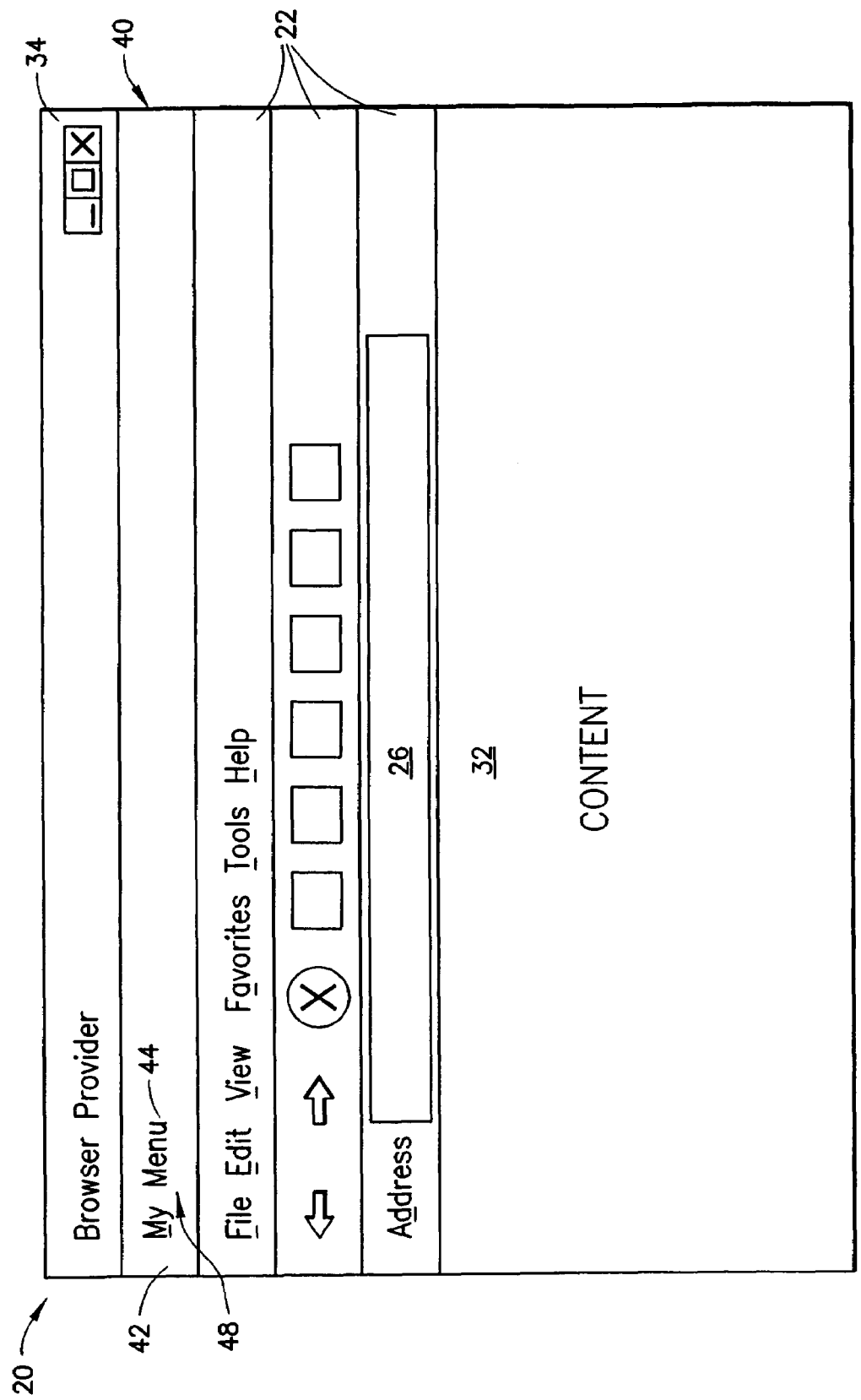
FIG. 3 depicts a view of an Internet browser interface having an interface toolbar including interface object in accordance with an embodiment of the present invention.
Figure 4:
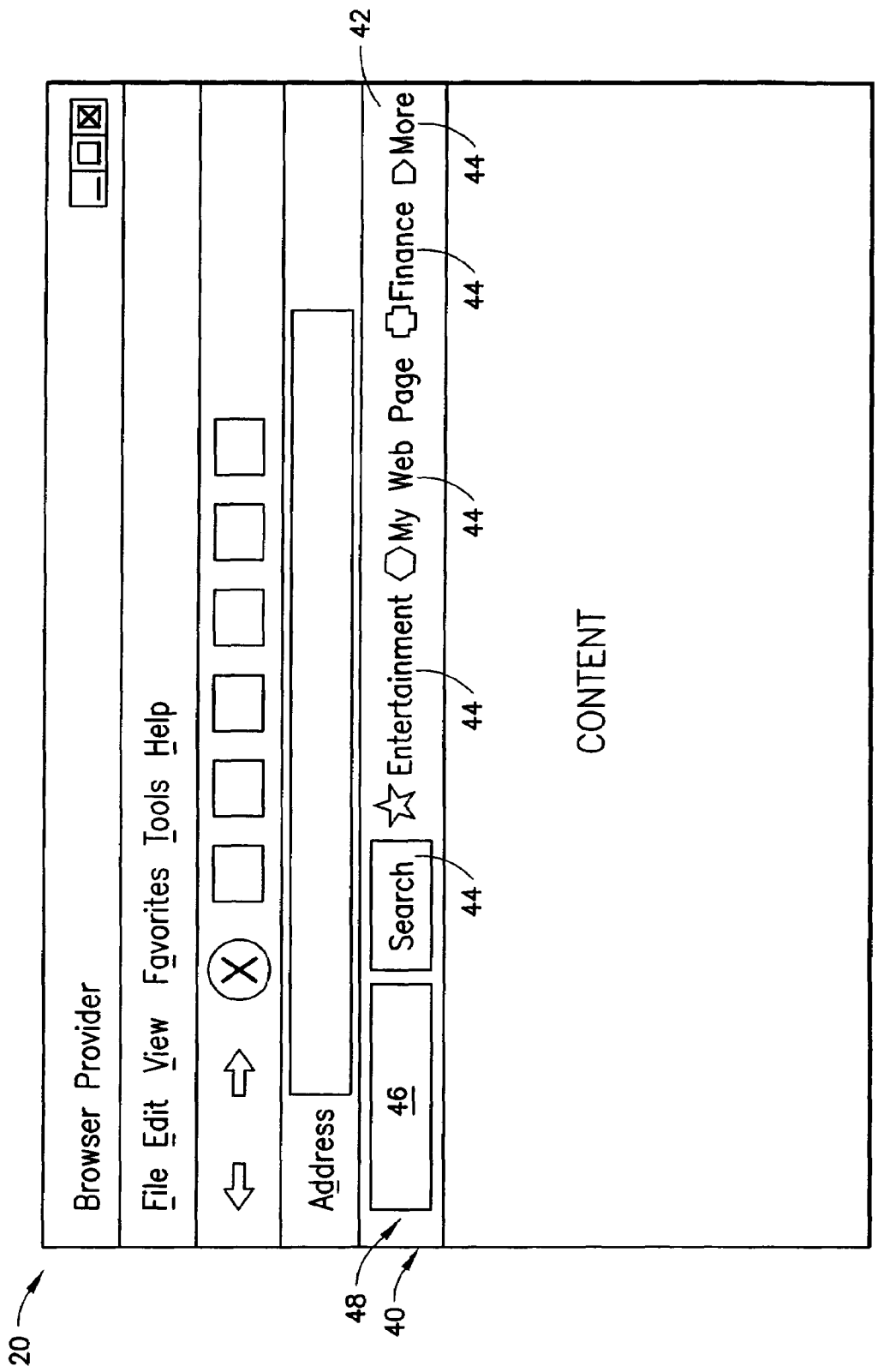
FIG. 4 depicts a view of an Internet browser interface having an interface toolbar including a plurality of interface objects in accordance with an embodiment of the present invention.

An Internet browser 20 configured in accordance with various embodiments of the present invention is depicted in FIGS. 2-4. In FIG. 2, the browser interface 20 includes an interface object 40 that is defined by the ActiveX control or Plug-in loaded in the library file 74 by the content provider 100. The interface object 40 comprises a pull-down menu 44 and is displayed in the browser toolbar 22 with the interface controls (i.e., browser toolbar objects) 24 provided by the browser 72. In FIG. 3, an interface object 40 comprises an interface object toolbar 42 and a pull-down menu 44 displayed as a separate window 48 within the browser interface 20. In FIG. 4, an interface object 40 comprises an interface toolbar 42 including a plurality of pull-down menus 44 and a search window 46 displayed within a separate 48 within the browser interface 20. An interface object 40, in accordance with the various embodiments of the present invention, may comprise virtually any type of information and/or functionality available via a browser. Thus, by way of non-limiting example, an interface object 40 may comprise a pull-down menu, a toolbar and a pull-down menu, textual information (e.g., advertisements, coupons, etc.), textual and/or aural information (e.g., a textual advertisement with accompanying sound), textual, aural, and/or graphical (animated or not) information, video, video and audio, audio, etc.

The various embodiments of the inventive Internet browser interface 20 depicted by FIGS. 2-4 are merely illustrative, non-limiting examples of the present invention. Variations to the depicted browser interfaces 20 may be possible in accordance with the teachings provided herein.

Figure 5:
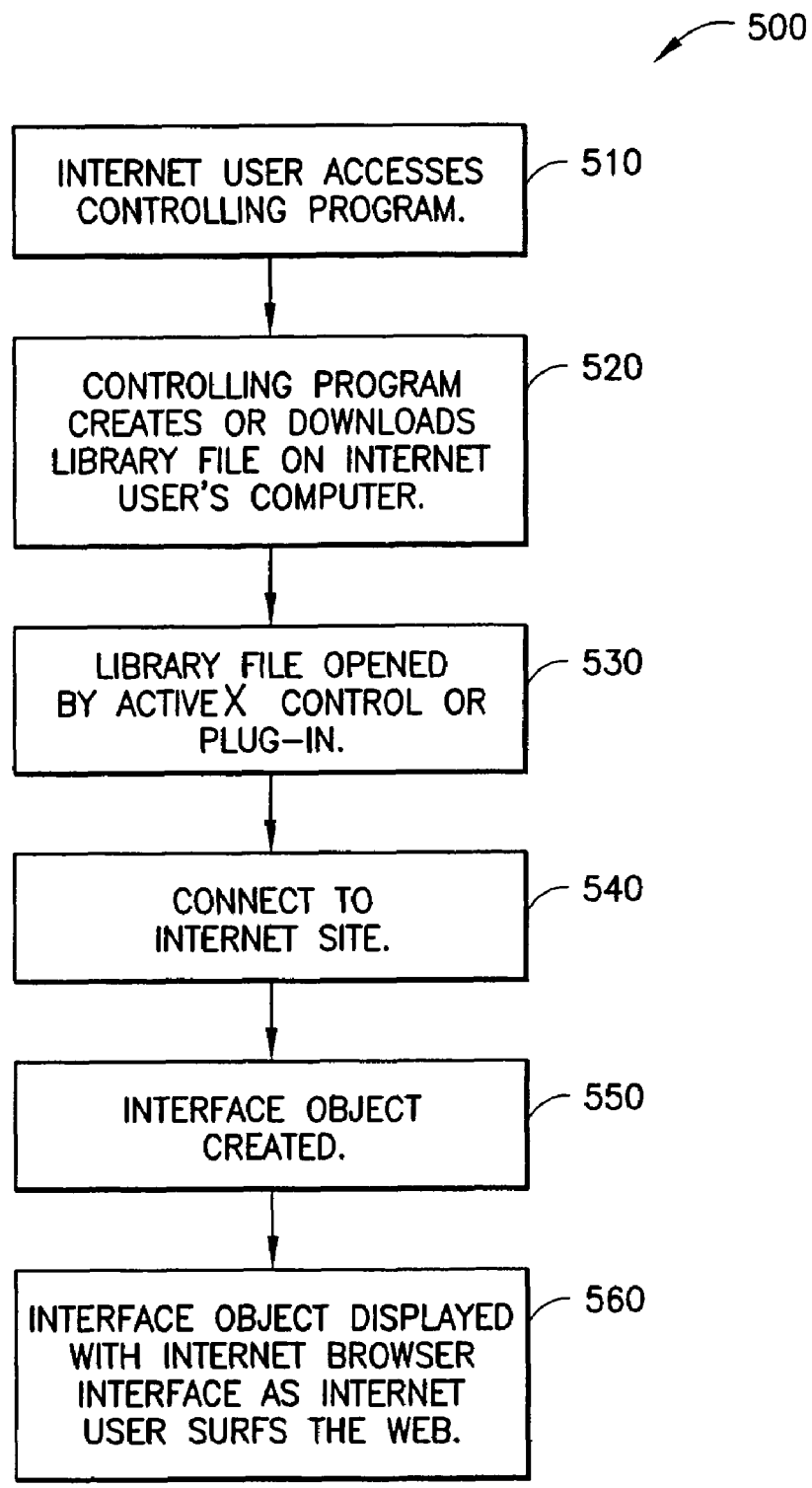
FIG. 5 is a flow diagram of a method of controlling an Internet browser interface in accordance with the present invention.

Referring next to FIG. 5, a method of controlling an Internet browser interface 20 is there depicted in accordance with an embodiment of the present invention, and designated generally as 500. At step 510, an Internet user accesses a controlling program 120 via an Internet web site 130, an ISP 80, or the user's computer 50. The controlling program 120, when executed by an Internet user, provides that user with the ability to thereafter control that user's Internet browser interface 20, as discussed in more detail below. The controlling program 120, at step 520, downloads or creates a library file 74 on the Internet user's computer 50 that includes ActiveX control or Plug-in code that define an interface object. Each time the Internet user activates the browser 72, the library file 74 is opened and a connection is automatically established to a predetermined Internet web site 110, one that is preferably configured to communicate (i.e., download) to the Internet user's computer 50, ActiveX control or Plug-in code for the interface object, as indicated at steps 530 and 540. The open library file 74 essentially provides a shell within the browser 70 within which the functionality provided by the ActiveX control or Plug-in may be added to the browser interface 20. Neither the library file 74 nor the shell close until the browser 72 is closed. At step 550, an interface object 40 is created that will be displayed in the browser interface 20; the information and/or functionality of the interface object 40 is defined by the ActiveX control or Plug-in. In accordance with the various embodiments of the present invention, the interface object 40 remains displayed by the browser 72 with the browser interface 20, as indicated at step 560, for as long as the user continues to surf the web, i.e., as long as the browser 72 is activated. Thus, the functionality added to the browser 72 and browser interface 20 in accordance with the present invention is not lost as the Internet user surfs the web.

The present invention provides various embodiments for controlling the browser 72 and browser interface 20, described generally above with reference to FIG. 5, each of which will now be described in detail.

Figure 6:
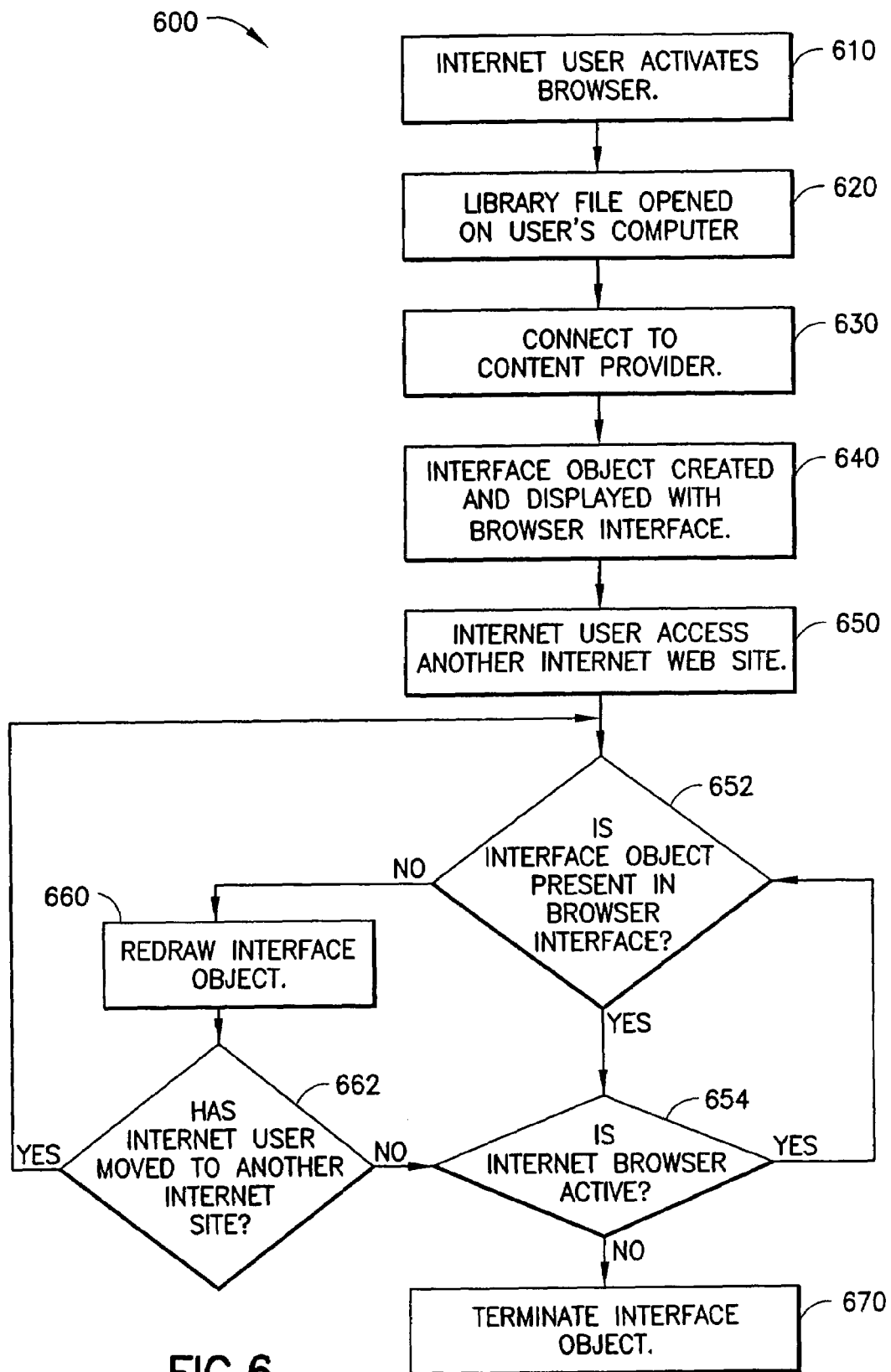
FIGS. 6-9 are a flow diagrams of a method of controlling and displaying an Internet browser interface in accordance with various embodiments of the present invention.

Referring next to FIG. 6 and with continued reference to FIG. 10, a description of an embodiment of a method of controlling and displaying a browser 72 and browser interface 20 in accordance with the present invention, designated generally as 600, will now be provided. For purposes of FIG. 6 and for the following discussion directed thereto, a library file 74 has already been downloaded or created on the Internet user's computer 50, as discussed herein. At step 610, an Internet user activates a browser 72 to initiate access to the Internet 90. At step 620, the library file 74 is opened and a connection automatically established to a predetermined content provider, as indicated at step 630. The functionality defined by the ActiveX control or Plug-in code of the BIO Library is communicated by the content provides to the user's computer 50, (i.e., to the library file 74) to create an interface object 40 which may be added to the browser interface 20. The interface object 40 is displayed with the Internet browser interface 20, as indicated in step 640. The functionality of the interface object 40, as defined by the ActiveX control or Plug-in code, remains with the Internet browser interface 20 as the Internet user traverses the Internet 90, regardless of the number or type of Internet sites the user visits, and as long as the browser 72 remains operational, i.e., as long as the Internet user is accessing the Internet 90 using the browser software program 72. When the Internet user moves from one Internet site to another, as indicated at step 650, the present invention determines whether the interface object 40 has survived that move, i.e., whether it is still displayed by the browser 72 in the browser interface 20, as indicated at step 652. If the interface object 40 is not displayed in the browser interface 20 (i.e., it has been removed from the browser interface 20 or otherwise terminated), the interface object 40 is redrawn, as indicated in step 660. If the interface object 40 has survived a user move from one Internet site to another and remains displayed in the browser interface 20, the present invention also determines, at step 654, if the browser 72 is active; since the interface object 40 is only displayed in the browser interface 20 when the browser 72 is operational. If the browser 72 is not active (i.e., the user is no longer surfing the web), the interface object 40 is terminated and the library file 74 is closed, as indicated at step 670. If the browser 72 remains active, the present invention continues, at step 652, to ensure that the interface object 40 is displayed with the browser interface 20. As the Internet user moves between and among Internet sites, the present invention monitors the status of the interface object 40 and ensures that it is displayed by the browser 72 with the browser interface 20 as long as the user is traversing the Internet 90.

According to the embodiment depicted in FIG. 6, the present invention ensures that the interface object 40 is displayed by the browser 72 with the browser interface 20 when the Internet user leaves the Internet web site 130 at which the BIO Library initially was called and loaded to the user's computer 50. For example, when the user activates the browser 72, a connection is automatically established to a first, predetermined Internet site 130 that is maintained by a first content provider 100 and the BIO Library is loaded onto the user's computer 50. The functionality provided by the BIO Library is then available to the browser 72 via a shell created by the library file 74. When the Internet user connects to a second Internet site 230 maintained by a second content provider 200, the functionality for the interface object 40 will continue to be present in the browser interface 20. In this embodiment, the present invention prevents the browser 72 or operating system 70 of the computer 50 from disabling the functionality of the BIO Library by unloading the library file 74 when the link to the first Internet site 130 is terminated.

For example, when the browser 72 initially connects to the first Internet site 130, that site 130 communicates functional information in the form of ActiveX control software code to the Internet user's computer 50 as a BIO Library, which is loaded into the library file 74. If the library file 74 is not explicitly instructed by the operating system 70 or the browser 72 to close or unload when the connection to the first Internet site 130 is terminated, the library file 74 will remain loaded, providing the desired functionality for the interface object 40 in the browser interface 20, even after the connection to the first Internet site 130 is closed. Keeping the library file 74 loaded while the Internet user moves between and among various Internet sites enables the loading of data, functions and objects outside of the ActiveX control (which is only communicated to the Internet user 50 by the first Internet site 130) but inside of the library file 74. As long as the library file 74 remains loaded, any data or objects created in the library file 74 and outside of the ActiveX control will stay loaded and continue to function in the browser interface 20.

To keep the library file 74 open during surfing, after the browser 72 has connected to the first Internet site 130, and before that connection is terminated, a global object, object A, is created in the program heap of the Internet user's computer 50, not the calling function heap. Thus, the global object survives the completion of the calling function. The global object may be created using the C++ new operator, or by declaring a global object in the global declarations. In either case, the global object will survive termination of the connection between the browser 72 and the first Internet site 130.

A global object thus defined remains functional after the ActiveX control provided by the first Internet site 130 closes, i.e. after the initial connection to the first Internet site 130 is terminated. Once the global object has been created, an interface is created using the global object. That interface will serve to, for example, remove, replace and/or add functionality to the browser 72 and browser interface 20. The interface may be created as part of the global object, or by the global object allocating a new interface object 40. For example, the interface object 40 may be created by creating, for example, an interface object window 48 within a browser window 38 (see, e.g., FIGS. 3 and 4), and adding it to the browser interface 20 as a child window Alternatively, the browser interface 20 may be directly modified such as, for example, by adding or modifying a browser toolbar 22 or a browser toolbar object 24 in the browser interface 20. Yet another alternative is to create an object interface toolbar 42 that is separate from the browser interface 20, as depicted in FIG. 4.

Additionally, a pointer is required that is used to control the browser 72, i.e. to instruct the browser 72 to establish a connection to a predetermined Internet site 130, for example. That pointer is preferably stored globally so that it is accessible by any function or object in the library file 74 that sends commands to the browser 72. In Microsoft Internet Explorer, for example, the IWebBrowser, IWebBrowser2, or IWebBrowserApp object linking and embedding (OLE) interface commands may be used to create the pointer. Using Microsoft Foundation Class (MFC), for example, the pointer may be created using the GetClientSite member of the COleControl class to retrieve a pointer from the first Internet site 130, i.e., the Internet site which loaded the BIO Library. The GetClientSite serves as the entry point for the browser 72 to communicate with the BIO Library. A GetContainer member of the IOleClientSite class returned by the previous step may be used to get a pointer to a container for the BIO Library. The BIO Library's container is a container within which an ActiveX control is loaded. An Internet browser interface 20 generally consists of several parts, including the browser toolbars 22 and the content window 32. A document object is created by the browser 72 for every web page an Internet user accesses and contains all of the data that appears in a particular web page. The document object is also the container for the BIO Library. Thus, a document object may also be referred to as a BIO Library's container.

A QueryInterface member of the IOleContainer class returned by the previous step may be used to get a pointer to the IServiceProvider interface, which may be used to locate any of the other interfaces that are presented by the browser 72. Finally, a QueryService member of the IServiceProvider class returned by the previous step may be used to get a pointer to the IWebBrowserApp, IWebBrowser, or IWebBrowser2 interface, depending on the specific interfaces provided by the browser 72 that called the BIO Library.

In an alternative embodiment, the present invention may be used to modify the entire browser window 30. If the entire browser window 30 is modified, as opposed to integrating an interface object 40 into an existing browser window 38, the entire class for the modified browser window 30 may be subclassed or, alternatively, the specific browser window 38 may be subclassed. As used herein, the term subclassing a window, also referred to as hooking a window, refers to the replacement of an original browser window message handling procedure for handling all messages sent to a window, with a user-defined window message handling procedure. For example, a window may be subclassed using the Microsoft Foundation Class (MFC) CWnd:SubclassWindow( ) function. Alternatively, a window may be subclassed using the call the SetWindowLong function (a Microsoft Windows function), with the GWL_WNDPROC argument (a Microsoft Windows constant). The pointer returned by the SetWindowLong function call may be stored to the original browser window message handling procedure for the subclassed window. This enables the BIO Library to intercept all messages passed to a window 30 or 38, and the BIO Library may interpret commands from interface controls 24 including buttons, menus, etc., provided by the browser 72 or from interface objects 40 that have been added by the BIO Library in accordance with the present invention.

The user-defined window message handling procedure that the BIO Library provides and that replaces the original browser window message handling procedure is referred to herein as the BIO Procedure. Using the BIO Procedure for the browser 72, messages (i.e., commands) intended for the browser 72 may be intercepted and modified, or replacement or new messages (e.g., message handlers for the interface object 40) may be communicated to the browser 72 by the BIO Procedure.

The present invention also ensures that the interface object 40 has not been removed from the browser interface 20. For example, some Internet browsers 72 redraw the entire browser interface 20 when an Internet user accesses a new web site. While the global object may still be functional following such Internet movement by the user, the interface object 40 will be removed from the browser interface 20 and thus, will not be displayed with the browser interface 20. To prevent this from occurring, messages (i.e., commands) from the browser 72 to repaint the browser interface 20 may be intercepted by the BIO Procedure and the interface object 40 may be redrawn immediately after the browser interface 20 is redrawn. Alternatively, the presence of the interface object 40 in the browser interface 20 may be periodically tested and if not present in the browser interface 20, the interface object 40 may be redrawn. Such periodic testing should preferably occur at intervals of less than approximately one second.

As an example of the above-described embodiment (depicted in FIG. 6), an ActiveX control is loaded as a BIO Library and adds menu items (and functionality) to the browser interface 20. The present invention creates an ActiveX control that dynamically creates a new global object, object A, which creates a new menu object (i.e., an interface object 40) with a desired functionality to be added to the browser interface 20. The menu object 40 may be added to the browser interface 20 using, for example, the instructions: AfxGetMainWnd( ) →GetMenu( )→AppendMenu( ), where the appended menu of the browser interface 20 would include a popup menu that points to the menu object 40. The browser interface window would then be subclassed and handle the messages for the menu object 40 handled by the BIO Procedure and the messages for the browser interface 20 being passed to the message handler for the browser 72. When the Internet user disconnects from the first Internet site 130 (i.e., leaves the web page containing the ActiveX control), the ActiveX control will close, but the global object, i.e., object A, will remain in the program heap and continue to provide the desired functionality to the browser interface 20.

Instead of subclassing the browser window within which the interface object 40 is added, object A, or one of its descendents, may retain ownership of the interface object 40. Then, a message handler for the interface object 40 may be created. For example, an interface object 40 may be added to a browser toolbar 22 in accordance with the above-described embodiment of the present invention, except that ownership of the interface object 40 is set using the Microsoft Foundation Class SetOwner function to be object A or one of it's descendents.

Figure 7:
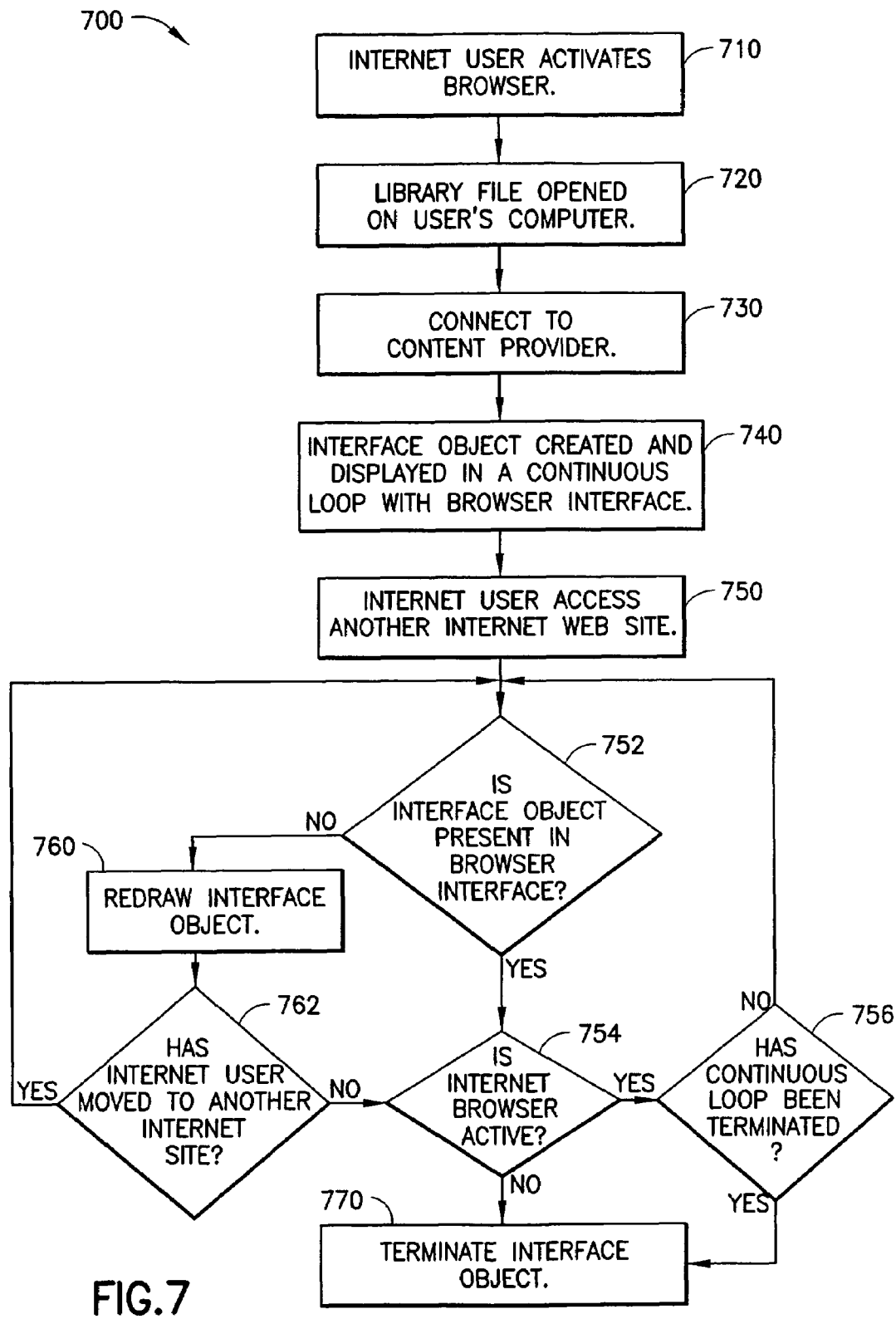

With reference next to FIG. 7 and continued reference to FIG. 10, a description of an alternate embodiment of a method of controlling and displaying a browser interface 20 in accordance with the present invention, designated generally as 700, will now be provided. For purposes of FIG. 7 and for the following discussion directed thereto, a library file 74 has already been created on the Internet user's computer 50, as described herein. At step 710, an Internet user activates a browser 72 to access the Internet 90. At step 720, the library file 74 is opened on the user's computer 50, and a connection is automatically established to a predetermined Internet site 130, as indicated at step 730. At step 740, the functionality defined by the ActiveX control or Plug-in code of the BIO Library is communicated by the content provider to the user's computer 50 (i.e., to the library file 74) to create an interface object 40 which may be displayed in the browser interface 20 using a continuous loop to control the display of the interface object 40. The interface object 40 may only be removed (i.e., its functionality terminated) upon termination of the continuous loop. The functionality of the interface object 40, as defined by the ActiveX control or Plug-in code, remains with the Internet browser interface 20 as the Internet user traverses the Internet 90, regardless of the number or type of Internet web sites the user visits, and as long as the browser 72 remains operational, i.e., as long as the Internet user is accessing the Internet using that browser software program. When the Internet user moves from one web site to another, as indicated at step 750, the present invention determines whether the interface object 40 has survived that move, i.e., whether it is still displayed in the browser interface 20, as indicated at step 752. If the interface object 40 is not displayed by the browser 72 in the browser interface 20 (i.e., it has been removed from the browser interface 20 or otherwise terminated), the interface object 40 is redrawn, as indicated in step 760. If the interface object 40 has survived a user move from one web site to another and remains displayed in the browser interface 20, the present invention also determines, at step 754, if the browser 72 is active; since the interface object 40 is only displayed by the browser 72 in the browser interface 20 when the browser 72 is operational. If the browser 72 is not active (i.e., the user is no longer surfing the web), the interface object 40 is terminated and the library file 74 is closed, as indicated at step 770. If the browser 72 remains active, the present invention determined, at step 756, whether the continuous loop has been terminated. If the loop has been terminated, the interface object 40 is also terminated, as indicated at step 770. If the loop is still executing, the present invention determines whether the interface object 40 is still displayed in the browser interface 20, as indicated at step 752.

The embodiment of the present invention depicted in FIG. 7 prevents an ActiveX control from unloading by freezing the operation of the library file 74 (within which the ActiveX control code is loaded), even if the operating system 70 or browser 72 generate an instruction to unload or terminate the library file 74. Because the library file 74 is frozen and never finishes unloading, all of the data, functions and objects created inside of the library file 74 by the ActiveX control will continue to exist and function after the library file 74 has been instructed to unload.

In some operating systems 70 and/or browsers 72, the BIO Library will be closed when the ActiveX control is no longer present at an Internet site. This can also occur when the Internet user moves from an Internet site having the ActiveX control, e.g., Internet site 130 in FIG. 10, to another Internet site that does not, e.g., Internet site 230 in FIG. 10. To enable the interface object 40 to continue to operate in the absence of the ActiveX control, the BIO Library (and the library file 74) must be prevented from closing.

To accomplish this, a pointer is created that is used to control the browser 72. That pointer is preferably stored globally so that it is accessible by any function or object in the library file 74 that may need to send commands to the browser 72. In Microsoft Internet Explorer, for example, the IWebBrowser, IWebBrowser2, or IWebBrowserApp OLE Interface commands may be used to create the pointer. To do this using Microsoft Foundation Class, the GetClientSite member of the COleControl class (which may be used to communicate with the BIO Library) may be used to retrieve a pointer to the BIO Library's Internet site, i.e. that Internet site that provides the ActiveX control. A GetContainer member of the IOleClientSite class returned by the previous step may be used to get a pointer to the BIO Library's container. A QueryInterface member of the IOleContainer class returned by the previous step may be used to get a pointer to the IServiceProvider interface. The IServiceProvider interface is used to easily find any of the other interfaces that are presented by the browser 72. A QueryService member of the IServiceProvider class returned by the previous step may be used to get a pointer to the IWebBrowserApp, IWebBrowser, or IWebBrowser2 interface depending on the interfaces presented by the version of the browser 72 that called the BIO Library.

To prevent the library file 74 from closing, its operation is halted before it is able to terminate. To freeze or halt the operation of the library file 74, a continuous program loop may be created and executed that terminates only when the BIO Library is to be unloaded, at which time, the program loop also pumps the message que. The program loop is referred to herein as a message pump, and may be created using for example, the PeekMessage, GetMessage, TranslateMessage and DispatchMessage commands in a loop. Exemplary C++ code to carry out the message pump is provided below:

```
while (m_Continue)
    {
        if (PeekMessage (&msg, NULL, 0, 0, PM_NOREMOVE) != 0)
        {
            GetMessage( &msg, NULL, 0, 0 );
            TranslateMessage( &msg );
            DispatchMessage( &msg );
        }
    }
``` where m_Continue is a Boolean variable that is used to instruct the loop when to stop, and PeekMessage, GetMessage, TranslateMessage, and DispatchMessage are all Windows functions. If m_Continue equals false, the loop will end, thus ending the message pump. The msg argument is a reference to a Windows MSG structure.

The way the message pump preferably operates is that it checks to see if there are any messages waiting in the message que using the PeekMessage function. If there is a message, the message pump grabs the message from the message que using the GetMessage function and translates it from a virtual-key message into a character message using the TranslateMessage function. Finally, the message pump sends the message to the original window message handling procedure that is due to receive the message using the DispatchMessage function.

The built in capabilities of an operating system 70 may be also used to construct a message pump to pump the message que. For example, a modal dialog box or message box, using a command such as the MFC command CWnd::MessageBox ("my modal", MB_OK), serves this purpose well and may be used to provided the desired freezing or halting of the operation of the library file 74.

As long as the message pump is executing a continuous loop, the ActiveX control will not terminate, even when the Internet user accesses (i.e., visits) other Internet sites.

The embodiment of the present invention depicted by FIG. 7 performs in the same manner (e.g., subclassing, message handling, etc.) as the above-described embodiment of FIG. 6.

For both of the above-described embodiments (of FIGS. 6 and 7), it is preferable, although not necessary, to provide an exit function for the interface object 40 so that object A and all of its descendents will be closed. Possible exemplary scenarios for calling an exit function include intercepting the message to close the browser window in the BIO Procedure, or periodically looking for the browser window and, if it is not found, terminating the ActiveX control.

Figure 8A:
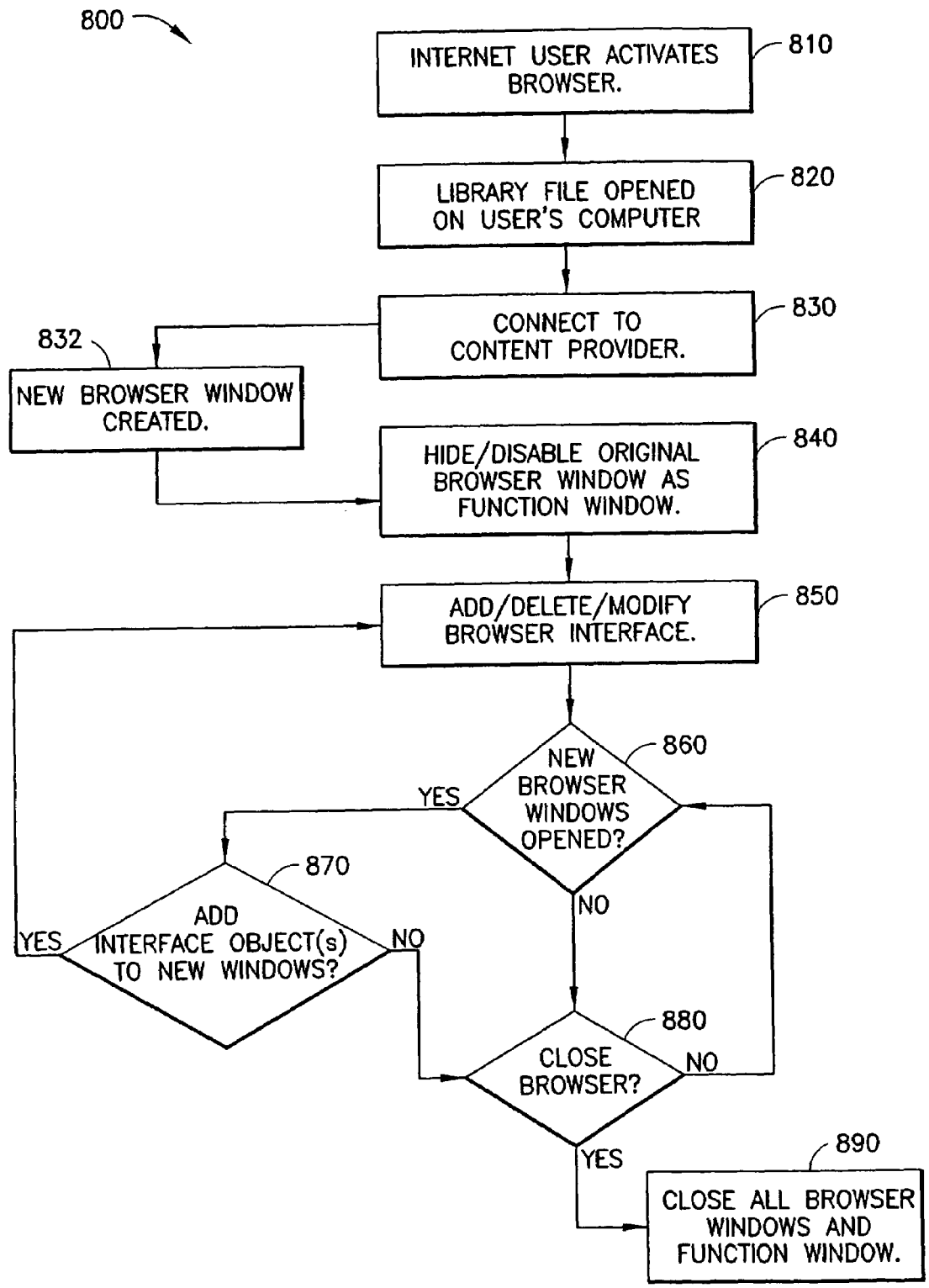

Referring next to FIG. 8A, yet another embodiment of the method of the present invention is depicted and designated generally as 800. For purposes of FIG. 8A and for the following discussion directed thereto, a library file 74 has already been created on the Internet user's computer 50, as described herein. At step 810, an Internet user activates a browser 72 to access the Internet 90. At step 820, the library file 74 is opened on the user's computer 50 and a connection is automatically established to a predetermined Internet site 130 (see, e.g., FIG. 10), as indicated at step 830. At step 832, a new browser interface is created that is a duplicate of the initial browser interface provided by the browser 72. At step 840, a Function Window is created that represents the original browser interface within which the functionality of the Plug-in was initially loaded.

Figure 8B:
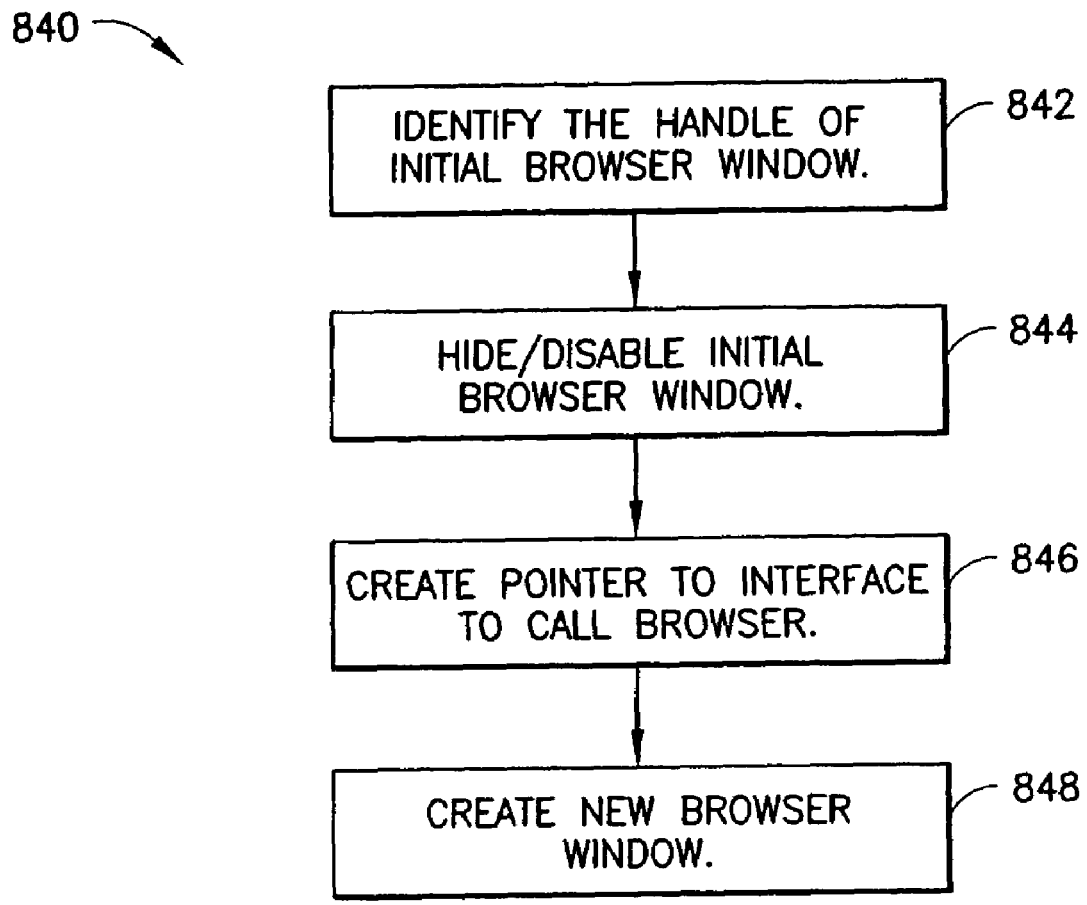

The steps for creating a Function Window in accordance with this embodiment of the present invention are depicted in FIG. 8B and designated generally as 840. At step 842, the handle for the initial browser interface window is identified. The initial browser interface window, now the Function Window, is hidden and/or disabled at step 844 so that it cannot be closed, which would cause the BIO Library to crash. At step 846, a pointer is created that is used to control the browser 72. Finally, a new browser interface window is created at step 848 that may be used by the Internet user to continue traversing the Internet.

With reference again to FIG. 8A, and beginning at step 850, the browser interface may now be controlled by first subclassing any browser windows, or any windows used by the browser, that are to be controlled, and then adding, deleting, and/or modifying the window(s) as described in more detail below. The original browser window message handling procedure is replaced with a BIO Procedure (as defined above). At step 860, the present invention determines whether any new browser windows have been opened, i.e., windows that may not already be subclassed or that may not have been controlled in accordance with the present invention. If new windows have been opened, the present invention determines, at step 870, whether the interface object 40 is to be added to those new windows. If not, the invention determines whether the Internet user desires to close the browser 72, as indicated at step 880. If so, the invention closes, at step 890, all browser windows, including the Function Window. If the user does not desire to close the browser 72, as determined at step 880, the invention returns to step 860 and again determines if new browser windows have been opened.

With continued reference to FIGS. 8A, 8B and 10, the above-described embodiment of the present invention will now be discussed in more detail. When an ActiveX control is loaded by a content provider 100 via an Internet site 130, typically in response to a browser 72 establishing a connection to that web site 130 and calling an ActiveX control, a library file 74 located on the user's computer is caused to open creating a shell within the browser 72 within which the code for the ActiveX control may be loaded. If the library file 74 that contains the ActiveX control is explicitly instructed, by the operating system 70 or the browser 72, to unload (i.e., close) when the ActiveX control is closed (when the user terminates the connection to the Internet site 130), any data, functions or objects that have been created outside of the ActiveX control but in the library file 74 will be destroyed when the library file is 74 unloaded. To prevent the library file 74 from unloading, the browser 72 is prevented from closing the ActiveX control until instructed. If the ActiveX control is never instructed to close, the library file 74 is never unloaded.

A preferred method of accomplishing this is to hide and/or disable the initial browser interface window that loaded the ActiveX control and to create a new copy of that same window within which the Internet user may continue to work and traverse the Internet. Because the initial browser interface is preferably hidden and/or disabled, the ActiveX control cannot be closed until the library file 74 shows, enables or closes the initial browser interface window, i.e. the window that loaded the library file 74.

The above-described method of FIG. 8A preferably loads the BIO Library as a standard ActiveX control in a browser 74, using, for example, the <Object> tag typically contained in a web page 130 or as a Band Object, and as described in the Microsoft Internet Explorer 4.x Software Development Kit. This instructs the browser 72 to initialize and run the library file 74 that contains the code for BIO Library.

The first time the BIO Library is initialized and called, a Function Window is created that keeps the BIO Library open by keeping a session with the ActiveX control itself open while the Internet user visits other Internet web sites 210, i.e., other web pages. The Function Window also makes it possible for browser windows that do not have a copy of the BIO Library open to access the OLE interfaces to the browser 72.

To create the Function Window, the initial browser interface window (i.e., that window which loaded the BIO Library) is preferably hidden and/or disabled. This may be accomplished by identifying the handle of the initial browser interface window, beginning with the handle of the BIO Library. To retrieve the initial browser interface window handle from the handle of the BIO Library, the GetParent function (a Windows Function) is continuously called until the present value for that function call represents one level below the desktop window. For example, a statement such as "m_Handle=GetParent(m_Handle)" executed in a loop may provide the desired functionality and result, where the value of m_Handle is initially equal to the value for the handle of the BIO Library, and will eventually return the handle to the initial browser interface window.

The next step is to hide and/or disable the initial browser interface window, now referred to as the Function Window, so that the Internet user cannot close the Function Window (by closing the browser 72, for example), thereby causing the BIO Library to unload and removing the functionality provided by the BIO Library from the browser interface 20. To hide the initial browser interface window from the user and/or disable that browser window from user-driven events, WM_SHOWWINDOW and/or WM_ENABLE messages (both Windows constants) may be sent to the initial browser interface window with values to hide and/or disable the browser window. For example, the PostMessage or SendMessage function (existing Windows functions) may be used to send a message to the initial browser interface window with the browser window handle. Alternatively, the ShowWindow and EnableWindow functions (existing Windows functions) may be used to achieve the same result.

A pointer is created to control the browser 72. This pointer is preferably stored globally so that it is accessible by any function or object in the library file 74 that sends commands to the browser 72. In Microsoft Internet Explorer for example, the IWebBrowser, IWebBrowser2, or IWebBrowserApp OLE interface may be used to create the pointer. To do this using Microsoft Foundation Class for example, the GetClientSite member of the COlecontrol class that serves as the entry point for the browser 72 may be used to communicate with the BIO Library, and to retrieve a pointer to the BIO Library's Internet site, i.e., that Internet site 130 that loaded the ActiveX control. A GetContainer member of the IOleClientSite class returned by the previous step may be used to get a pointer to the BIO Library's container. A QueryInterface member of the IOleContainer class returned by the previous step may be used to get a pointer to the IServiceProvider interface; with the IServiceProvider interface preferably being used to find any of the other interfaces that are presented by the browser 72. A QueryService member of the IServiceProvider class by in the previous step may be used to get a pointer to the IWebBrowserApp, IWebBrowser, or IWebBrowser2 interface depending on the interfaces presented by the version of the browser 72 that called the BIO Library.

Finally, a new browser window is created that the Internet user may use to continue surfing the web, i.e., to continue accessing various different Internet sites, since the browser window previously used to create the Function Window has been hidden and/or disabled. Preferably, any of the IWebBrowser, IWebBrowser2, or IWebBrowserApp OLE interface is used to create a new browser window, for example, using the Navigate or Navigate2 members of that OLE interface. Alternatively, a WM_COMMAND message that corresponds to any command the browser 72 might use to open a new browser window such as a New Window command or Open In New Window command, etc., may be sent to the browser 72. A new window may also be opened using the Dynamic Data Exchange (DDE) support provided by the browser 72.

The BIO Library must now add/delete/modify, i.e., control, various browser interface features and functionality. The first step is to subclass any of the browser windows or any of the windows the browser uses (i.e., children) that are to be controlled in accordance with the present invention. A BIO window message handling procedure is used to replace the original window message handling procedure, and is hereinafter referred to as the BIO Procedure.

Once the browser window, or any of it's children, have been subclassed, it is possible to add menus to a subclass by retrieving a pointer to the browser window menu using the GetMenu function. Once the pointer to the menu's handle is obtained, the menu functions such as ModifyMenu, AppendMenu, InsertMenu, etc., may be used to add any desired menus to the browser window. Any commands assigned to a menu must be handled by the BIO Procedure used to subclass the BIO window. The same command identifier must not be used in creating a menu as any that are included in the browser.

An interface object toolbar 42 may be added to the browser interface 20 by retrieving the handle of the window to which the toolbar 42 is to be added to (hereinafter referred to as the Frame Handle) using standard Windows functions. Typically, the window will be the BIO window or a frame window that is a child of the BIO window. A window is then created using the Frame Handle as its parent. For example, to add a dialog bar (which is a form of a toolbar) as an interface object 40, an object derived from or of a type CDialogBar (a Microsoft Foundation Class) is created and it's Create method called using Frame Handle. If resources such as, for example, images, toolbars, dialogs, etc., are being used and the browser 72 does not share the same resources as the BIO Library, the browser's resources are temporarily replaced with the BIO Library resources before any data may be loaded from the BIO Library resource. The BIO Library resources may then be replaced with the browser's original resources.

As new browser windows are opened, it may be desirable to add interface object(s) 40 to those new windows. A timer may be created using SetTimer Windows function that would call a user-defined function and that function would use the FindWindowEx function (a Windows function) to check every child of the desktop window for a window with the same class name as the Function Window. For those browser windows that have not already been modified, i.e., that do not have the interface object 40, the necessary handles may be retrieved and the same changes made as were made for the original BIO Window.

Finally, when the Internet user desires to close the browser 72, it must be determined if all of the browser windows are closed, except the Function Window, and the Function Window must also be closed if all other browser windows are closed. This may be accomplished by listening for a WM_CLOSE message (a Windows constant) in the BIO message handling procedure or by setting a timer that periodically determines how many browser windows are open. To close the original Function Window, a WM_CLOSE message may be sent to that window.

Figure 9:
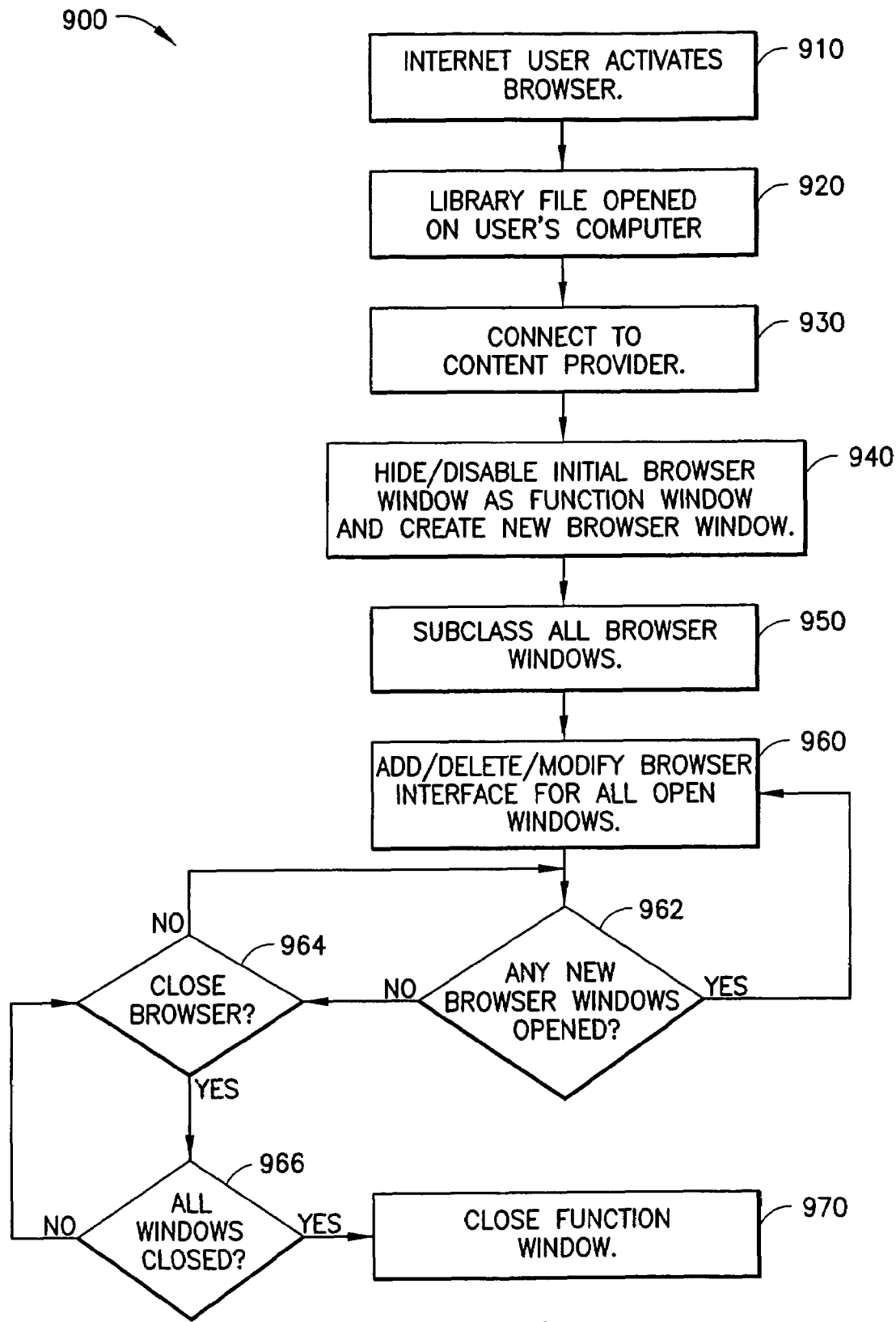

Referring next to FIG. 9, another alternative embodiment of a method of controlling and displaying an Internet browser interface 20 in accordance with the present invention is depicted and generally designated as 900.

Steps 910, 920, and 930 are essentially the same as described above for the embodiments of FIGS. 6-8B. At step 940, a new browser interface window is created and the initial browser interface window is hidden and/or disabled, and referred to as a Function Window. The Plug-in identifies the handle for the initial browser interface window, hides and/or disables that window, and creates a new browser interface window that may be used by the Internet user. At step 950, all the browser windows are subclassed, and then the browser interface may be controlled, as indicated at step 960, for all open windows. At step 962, the present invention determines if any new browser windows have been opened, in which case the invention returns to step 960. In no new browser interface windows have been opened, step 962 proceeds to step 964 to determine if the Internet user desires to close the browser. All windows must be closed prior to closing the Function Window, and that is determined at step 966. If all windows are closed, the Function Window is closed, as indicated at step 970. Otherwise, step 966 returns to step 964.

In yet another alternative embodiment of the present invention, the present invention provides a method of controlling an Internet browser interface using a browser Plug-in to control (i.e., add, remove and/or modify) the functionality of the calling browser 72 and to retain the Plug-in functionality after the user leaves the Internet site 130 that loaded the Plug-in.

When a browser Plug-in is loaded to an Internet user's computer 50 in response to a browser 72 establishing a connection to an Internet site 130 and calling the Plug-in, a library file 74 establishes a shell within the browser 72 and within which the code for the Plug-in may be loaded. If the library file 74 is explicitly instructed by the operating system 70 or the browser 72 to unload when the Plug-in is closed, any data, functions or objects that have been created outside of the Plug-in but in the library file 74, will be destroyed when the library file 74 is unloaded. To prevent the library file 74 from unloading, the browser 72 is prevented from closing the Plug-in until the browser 72 receives an instruction to close the Plug-in. If the Plug-in is never instructed to close, the library file 74 also is never instructed to unload. This may be accomplished by hiding and/or disabling the initial browser window that loaded the Plug-in and by creating a new copy of that same window for the Internet user to continue to use to access and traverse the Internet. Because the initial browser window is preferably hidden and/or disabled, the Plug-in can not be closed until the library file 74 chooses to show, enable or close the initial browser window that loaded the Plug-in.

For example, a browser Plug-in is loaded as a standard Plug-in in a browser 72, preferably by using the <Embed> tag in a web page 110 (see e.g., FIG. 10), which instructs the browser 72 to initialize and load the library file 74 that contains the code for the Plug-in (i.e., the BIO Library).

The first time the BIO Library is initialized and called, a Function Window is created by hiding and/or disabling the original browser window, thus preventing the BIO Library from unloading by keeping a session with the Plug-in itself open. The Function Window also makes it possible for browser windows that do not have a copy of the BIO Library open to access built-in Application Programming Interfaces (APIs) for Plug-ins (i.e., functionality made available to the Internet user through the browser interface 20 and via the Plug-in functionality), such as those provided with Netscape Navigator and Microsoft Internet Explorer.

A Function Window is preferably created by disabling or hiding the initial browser window (in which the Plug-in resides) the first time the Plug-in is called by the browser 72. To do this the Plug-in must first identify the handle of the initial browser window. A window member of the NPWindow structure is passed to the BIO Library from the browser 72 as a second argument to the NPP_SetWindow Function and is the handle to the Plug-in window (NPWindow and NPP_SetWindow are part of the Netscape and Internet Explorer API for Plug-Ins). To retrieve the initial browser window handle from this window member, the GetParent function (a Windows function) is continuously called until the present value for that function call represents one level below the desktop window. For example, a statement such as "m_Handle=GetParent(m_Handle)" executed in a loop may provide the desired functionality and result, where the value of m_Handle is initially equal to the value for the handle of the NPWindow structure, and will eventually return the handle for the initial browser window.

The initial browser window is then hidden and/or disabled so that the Internet user cannot close the Function Window and cause the BIO Library to crash. To hide the initial browser window from the user and/or disable that window from user-driven events, WM_SHOWWINDOW and/or WM_ENABLE messages (both Windows constants) may be sent to the initial browser window with values to hide and/or disable that browser window. This can be accomplished by, for example, using the PostMessage or SendMessage function (Windows functions) to send a message to the initial browser window using the browser window handle. Alternatively, the ShowWindow and EnableWindow functions (Windows functions) may be used to achieve the same results.

The final step is to create a new browser window that the Internet user can use to continue surfing the web after the initial browser window has been hidden and/or disabled. This may be accomplished, for example, by calling any of the following Netscape and Internet Explorer Plug-in API functions: NPN_GetURL, NPN_PostURL, NPN_GetURLNotify, NPN_PostURLNotify, with the target parameter set to _new, _blank, or any window name that does not already exist. The NPP argument of the above functions is the NPP structure that was provided by the browser 72 to the Plug-in for the Function Window. Another way of doing this is to send a WM_COMMAND message to the browser 72 that corresponds to any command the browser 72 might use to open a new window such as a New Window command or Open In New Window command, for example. A new window may also be opened using the Dynamic Data Exchange (DDE) Support provided by the browser. NPN_GetURL, NPN_PostURL, NPN_GetURLNotify, NPN_PostURLNotify and the NPP structure are part of the Netscape and Internet Explorer API for Plug-Ins and the WM_COMMAND is a Windows constant.

The BIO Plug-in may now control, i.e., add/delete/modify, features and functionality of the browser 72. The first step is to subclass any of the browser windows or any of the windows the browser uses (collectively, BIO windows) that are to be controlled in accordance with the present invention.

After the browser window or any of it's children has been subclassed, menus may be added to the browser interface 20 by retrieving a pointer to the browser window menu using the GetMenu function (a Windows function). Once the pointer to the menu's handle is obtained, the menu functions such as ModifyMenu, AppendMenu, InsertMenu, etc. (Windows functions), may be used to add any desired menus to the browser window. Any commands assigned to a menu must be handled by the BIO message handling procedure used to subclass the BIO window, taking care not to use the same command identifier in creating a menu as any included in the browser 72.

Alternatively or additionally, an interface object toolbar 42 may be added to the browser interface 20 by retrieving the handle of the window to which the toolbar 42 is to be added (hereinafter referred to as the Frame Handle) using standard windows functions—typically the window will be the BIO window or a frame window that is a child of the BIO window. A window is then created using the Frame Handle as its parent. For example, to add a dialog bar (which is a form of a toolbar) as an interface object 40, an object derived from or of type CDialogBar (a Microsoft Foundation Class) may be created and it's Create method called using the Frame Handle. If resources such as, for example, images, toolbars, dialogs, etc., are being used and the browser 72 does not share the same resources as the BIO Library, the browser's resources are temporarily replaced with the BIO Library resources before any data from the BIO Library resource may be loaded. The BIO Library resources may then be replaced with the browser's original resources.

As new browser windows are opened, the interface object 40 may be added to those new windows. This may be accomplished by creating a timer using SetTimer (a Windows function) that would call a user-defined function that would use the FindWindowEx function (a Windows function) to check every child of the desktop window for a window with the same class name as the Function Window. For those new windows that do not already have the modified interface, i.e., that do not include the interface object 40, the necessary handles are retrieved and the same changes made to those windows as were made to the original BIO window.

Finally, when the Internet user wishes to close the browser 72, it must be determined if all of the browser windows are closed except the Function Window, and if they are, the Function Window may be closed. This may be accomplished, for example, by listening for a WM_CLOSE message (a Windows constant) in the BIO window message handling procedure or by setting a timer that periodically checks the number of open browser windows. The original Function Window may be closed by sending it a WM_CLOSE message.

In accordance with the present invention, a BIO Library (i.e., a Plug-in) may be loaded and its functionality provided in the browser interface 20, automatically, i.e., without requiring the user to positively access a particular Internet site, i.e., to surf to a web page that calls the Plug-in. For example, Netscape has a key in its windows registry identified as Automation Startup. Upon activation, Netscape loads all of the OLE controls that are listed in the Automation Startup key. By placing a reference or a call to the library file 74 (and thus to BIO Library and Plug-in that defines an interface object 40) in the Automation Startup key, the library file may be loaded every time a user activates a Netscape browser. Included in that library file 74 may be instructions to create an instance of the interface object 40 in the browser interface 20 and an instruction for the browser 72 to establish a connection to a predetermined Internet site 130. Using this technique, a user does not have to choose to visit a specific Internet site 130 to load a BIO Library. The library file 74 needs to be kept open at least until the Plug-in may be loaded in the browser 72 for display and access via the browser interface 20. One way to do this is to increment a reference counter associated with the library file 74 so that when Netscape unload the OLE controls listed in the Automation Startup key, the library file 74 will not be unloaded because it has a higher reference number.

The library file 74 may be loaded as a Plug-in using DDE to periodically look for a Netscape DDE Server using a timer or a loop. When a return is received by the browser 72 from the Netscape DDE server, Netscape is ready to receive commands and may be loaded with the Plug-in. DDE may then be used to send a command, such as WWW_OPENURL, to the browser 72, which will cause the Plug-in to load as discussed herein.

Another method for hiding the Netscape Plug-in window that is used for BIO Library is to remove it from the task bar (i.e., where the Windows "Start" button is located) and place it off of the visible screen. One way to remove it from the Task Bar is to call SetWindowLong and change the window style of the Plug-in window to a toolbox window. Toolbox window's do not appear in the task bar. The Netscape Plug-in window may be placed off screen by calling MoveWindow and providing coordinates that are not in the visible range for the users desktop.

The BIO window message handling procedure that is used to replace the original browser message handling procedure must know which window a message is intended to reach and what to do with a message once the BIO window message handling procedure receives that message. A preferred way to do this is to create a map that links one piece of information to another. For the present invention, a map that links window handles to structures that contain important information to that window is preferably used. For example when the BIO Library adds the interface object 40 to a new browser window, a new entry in the map is created that links the BIO window's handle to a structure that contains information useful for that BIO window. One of the pieces of information contained in the structure would preferably be the browser's original window message handling procedure for the BIO window. It is necessary to maintain the browser's original window message handling procedure so that if the BIO window message handling procedure does not know how to handle a message, it can pass the message to the browser's original window message handling procedure.

When a message is received by the BIO window message handling procedure, the first argument that is passed to the procedure is the handle of the window that received the message. To retrieve the structure that contains all of the data specific to that window, a lookup in the map is performed using the window handle as a key. The returned structure will contain all of the stored window specific information, such as the original window message handling procedure.

When controlling the browser interface 20, i.e., adding to, removing from or modifying the browser interface, the present invention changes how the browser 72 works. Almost anything an Internet user can do with a browser works by sending a message to a browser's window or child window. Objects or windows that send messages include the menus, buttons, combo boxes and almost anything else with which the Internet user can directly interact, i.e., interface controls. Messages for example can be broken up into four components: 1) the handle of the window intended to receive the message; 2) the msg value of the message; 3) a wParam, whose use is usually dependent on the msg value; and 4) an lParam, whose value is also usually dependent on the value of the msg value.

For example, clicking on a button in a browser's window might send a message that contains the WM_COMMAND, which is a Windows constant, msg value to a browser window's window message handling procedure. The lower two bytes of the wParam variable in that message would then be a number that is used to identify which button was pressed.

By subclassing a browser's window or child window, as described above, any messages that are sent when a user interacts with any of the interface controls may be intercepted. Once a message is intercepted, the BIO window message handling procedure can interpret it and react to it. If the functionality of the interface control is to remain the same (i.e., not added to, deleted from, or modified by the present invention), the message may be passed back to the original window message handling procedure. In this way, virtually all of the interface controls that exist in the browser 72 may be controlled. In addition, interface controls may be added to the browser interface 20 and assigned command identifiers (which are passed in the wParam). The BIO window message handling procedure can then interpret the wParam and provide the functionality of the Interface control that is to be added. In addition, functionality may be removed by simply having the inventive window procedure do nothing if it receives a command identifier associated with an interface control that is to be removed from the browser. That command may thus be prevented from passing to the browser window's original message handling procedure.

Using the various embodiment of the present invention, as discussed in detail above, an Internet user may create a browser interface 20 having user-defined interface controls. Then, by setting the parent of the window for that browser interface 20 to a window that has been subclassed, any message from the new (i.e., controlled) window will be handled in the BIO window message handling procedure. This can be used to add any interface object 40 such as a toolbar, dialogbar, floating dialog etc., to the browser interface 20.

The following illustrative, non-limiting application examples are provided to further describe the present invention. A Plug-in or ActiveX control that stays persistent as an Internet user traverses the Internet may add an interface object 40 to the browser interface 20 that enables a user to download their "bookmarks" or "favorites" from a database located on the Internet. The interface will be added directly into the browser interface and will allow the user to visit the "bookmarks" or "favorites" links that they downloaded, using the interface object 40 provided by the Plug-in or ActiveX control. This interface object 40 will serve a similar function to the current "favorites" or "bookmarks" menu items and toolbars on existing browsers. The beneficial difference is that since the bookmarks will be downloaded from a database on the Internet, users have access to their bookmarks on any computer's browser that is capable of loading the Plug-in or ActiveX control.

The present invention may also be used to generate revenue based on placing advertising "links" included in the "favorites" or "bookmarks" on the browser interface 20 via the Plug-in or ActiveX control. Consumer targeting could be based on, for example, information stored in databases, such as name, age, sex, income, race, education and geographic location, and preferences such as favorites and bookmarks or other preferences that are stored on the database or exist on the browser 72.

A Plug-in or ActiveX control that stays persistent as the user traverses the Internet may be used to add an interface object 40 to the browser interface 20 that permits a user to download their "address book" from of a database located on the Internet. Such an interface object 40 may be added directly into the interface of the browser interface 20 and will allow the user to send e-mail as well as retrieve stored information for contacts listed in their "address book".

The present invention may also be used to earn revenue based on placing advertising "links" included in the "address book" on an interface object 40 of the Plug-in or ActiveX control. Consumer targeting could be based for example on information stored in databases, such as name, age, sex, income, race, education and geographic location, and preferences such as favorites and bookmarks or other preferences that are stored on the database or exist on the browser.

The present invention may use a Plug-in or ActiveX control to add an edit box on the browser interface 20 that allows a user to type a search directly into the browser instead of having to visit a web page that allows the user to search.

Additionally, the Plug-in or ActiveX control that stays persistent may poll, or periodically seek—at user, web site or program selected intervals—information from a preferred web site, even though the user is surfing a different web site. As the preferred web site is polled, the preferred web site can send updated information to the interface object on the user's browser, such as near real-time notification of the receipt of mail, continuous updating of stock prices, or other time sensitive information, such as, for example, news feed headlines, sports scores for selected favorite sports teams, and the like. The preferred web site can control, if desired, the timing of the polling, so as to control the traffic at the preferred web site during peak usage periods by extending the time interval between polls.

Since the shell created by the library file, as described herein, is an environment within which applications can be run, or information displayed, any information or program can be added to the interface of the browser using the present invention. The shell is independent of the browser interface, the content of the browser, and even the content of the shell itself. In short, the shell is an adaptable piece of functionality that does not, in the extreme, even need to be visible to the user. Thus, in use, the shell can be empty and receive its contents from a web site, or the shell could get Plug-ins, or the shell could even get new library files and learn to parse new information "on the fly" as the shell receives new contents from a web site or user. Thus the present invention provides significant opportunities to direct desired information from a preferred site to the user even as the user visits other sites. Of course, the more user-specific functionality provided by a web site via the customizable interface of the present invention, the greater user loyalty that web site can engender.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of controlling an Internet browser interface displayed by an Internet browser on a display of a computing device, the Internet browser having a user interface area and a web page display area and enabling a user of the Internet browser to access and navigate the Internet and to receive and display one or more web pages from one or more Internet sites, including the display of a web page from a predetermined Internet site, the Internet browser having at least one Internet browser toolbar having at least one toolbar button providing a predetermined functionality to the user, said method comprising the steps of:
   (a) providing, at the predetermined Internet site, one or more web pages via which a program for controlling the Internet browser interface can be downloaded; and
   (b) downloading by the predetermined Internet site said program that causes the visible display of a user toolbar, the user toolbar comprising additional functionality not present in the browser prior to download, the user toolbar displayed within the bounds of the browser user interface area such that the user toolbar does not overlay the web page display area or the browser user interface area, and that makes the additional functionality available to the user as part of the browser user interface such that once the user toolbar is displayed the user toolbar remains displayed and said additional functionality remains available to the user regardless of the Internet site to which the Internet browser is caused to navigate.

2. A method as recited by claim 1, wherein the user toolbar comprises an interface object and is customizable by the user to provide user-selected functionality in the user toolbar.

3. A method as recited by claim 2, wherein the interface object is a toolbar button.

4. A method as recited by claim 2, wherein the interface object comprises a search window that enables the user to initiate a search at the predetermined Internet site regardless of the Internet site to which the user has navigated at the time the search is initiated.

5. A method as recited by claim 1, wherein the program comprises an ActiveX control.

6. A method as recited by claim 1, wherein the program comprises a Plug-in.

7. A method as recited by claim 1, wherein the predetermined Internet site maintains user-specific information for a plurality of users, including the user of the Internet browser, said method further comprising the step of downloading by the predetermined Internet site information specific to the user for defining all or part of the user toolbar and wherein all or part of the display of the user toolbar is dependent upon the information downloaded by the predetermined Internet site.

8. A method as recited by claim 7, further comprising the step of downloading by the predetermined Internet site additional information specific to the user for defining all or part of the user toolbar, and wherein all or part of the display of the user toolbar is dependent upon the downloaded additional information.

9. The method of claim 1 wherein the user toolbar comprises a button via which the user can establish a connection to an email service.

10. The method of claim 1 wherein the user toolbar comprises a button via which the user can access a list of said user's favorite websites.

11. The method of claim 1 wherein the user toolbar comprises a button via which the user can access a list of user addresses.

12. The method of claim 1 wherein the user toolbar comprises an advertisement.

13. An Internet browser interface displayed on a display of a computing device by an Internet browser, the Internet browser interface comprising:
   a user interface area and a web page display area, said browser facilitating navigation to one or more Internet sites, including a predetermined Internet site;
   the Internet browser interface further comprising at least one Internet browser toolbar having predetermined functionality available to a user of the Internet browser, the Internet browser further facilitating visible display on the computing device of one or more web pages from the one or more Internet sites, including display of web pages from the predetermined Internet site; and
   said Internet browser interface further comprising, after download of software from said predetermined Internet site, a user toolbar that is visibly displayed on the computing device as part of the Internet browser interface, the user toolbar comprising functionality not present in the Internet browser prior to download, the user toolbar displayed within the bounds of the user interface area such that the user toolbar does not overlay the web page display area or the browser user interface area, said user toolbar being visibly displayed on the computing device in the browser user interface area along with the Internet browser toolbar while the Internet browser is activated regardless of the Internet site to which the Internet browser is caused to navigate.

14. An Internet browser interface as recited by claim 13, wherein said user toolbar comprises an interface object and is customizable by the user.

15. An Internet browser interface as recited by claim 14, wherein said interface object comprises a toolbar button.

16. An Internet browser interface as recited by claim 14, wherein said interface object comprises a search window that enables the user to initiate a search at the predetermined Internet site regardless of the Internet site to which the Internet browser is navigated at the time the search is initiated.

17. An Internet browser interface as recited by claim 14, wherein said software comprises an ActiveX control that enables user customization of said interface object.

18. An Internet browser interface as recited by claim 14, wherein said software comprises a Plug-in control that enables user customization of said interface object.

19. An Internet browser interface as recited by claim 14, wherein the predetermined Internet site maintains user-specific information for a plurality of users, including the user of the Internet browser, and wherein said software causes the Internet browser to establish a connection to the predetermined Internet site when the Internet browser is first activated and to receive information specific to the user from the predetermined Internet site, and wherein all or part of said user toolbar is dependent upon the information.

20. An Internet browser interface as recited by claim 19, wherein said software causes the Internet browser to periodically re-establish a connection to the predetermined Internet site while the Internet browser is activated to receive additional information specific to the user of the Internet browser from the predetermined Internet site, and wherein all or part of said user toolbar is dependent upon the received information and the additional information.

21. The interface of claim 13 wherein the user toolbar comprises a button via which the user can establish a connection to an email service.

22. The interface of claim 13 wherein the user toolbar comprises a button via which the user can access a list of said user's favorite websites.

23. The interface of claim 13 wherein the user toolbar comprises a button via which the user can access a list of user addresses.

24. The interface of claim 13 wherein the user toolbar comprises an advertisement.

25. A system for controlling an Internet browser interface displayed by an Internet browser on a display of a computer, said browser interface comprising a user interface area and a web page display area, said system comprising:
   a server computer, said server computer coupled to a storage medium and hosting a download feature accessible over the Internet by a user for controlling the Internet browser interface; and
   a file stored on said storage medium downloadable by said server computer for controlling the Internet browser interface in the form of an added user toolbar offering user toolbar functionality that remains available to a user of the computer regardless of the Internet site to which the Internet browser is caused to navigate, the user toolbar comprising functionality not present in the Internet browser prior to download, the user toolbar being visibly displayed within the bounds of the user interface area such that the user toolbar does not overlay the web page display area or the user interface area.

26. A system as recited by claim 25, wherein said downloadable file causes the user toolbar to be displayed as part of the Internet browser interface upon a subsequent activation of said browser after download.

27. A system as recited by claim 26, wherein said downloadable file causes an interface object to be displayed as part of said user toolbar.

28. A system as recited by claim 27, wherein said interface object enables a user of the computer to customize the user toolbar and comprises an ActiveX control.

29. A system as recited by claim 27, wherein said interface object enables a user of the computer to customize the user toolbar and comprises a Plug-in.

30. A system as recited by claim 27, wherein said interface object is a toolbar button.

31. A system as recited by claim 27, wherein said interface object is a search window that enables the user of the Internet browser to initiate a search at a predetermined Internet site regardless of an Internet site to which the browser is navigated at the time the search is initiated.

32. The system of claim 25 wherein the user toolbar comprises a button via which the user can establish a connection to an email service.

33. The system of claim 25 wherein the user toolbar comprises a button via which the user can access a list of said user's favorite websites.

34. The system of claim 25 wherein the user toolbar comprises a button via which the user can access a list of user addresses.

35. The system of claim 25 wherein the user toolbar comprises an advertisement.

36. A system for controlling an Internet browser displayed on a display of a computer, said system comprising:
   a server for downloading files; and
   a file, downloadable by said server, said file controlling the Internet browser so that the Internet browser enables a user of the computer to perform functions via the Internet browser not available to the user via the Internet browser prior to said file being downloaded, said functions being made available via a user toolbar that is added to and visibly displayed within the bounds of a user interface area of the Internet browser such that the user toolbar does not overlay a web page display area of the Internet browser or the user interface area of the Internet browser, said functions remain available to the user regardless of the Internet site to which the Internet browser is caused to navigate.

37. A system as recited by claim 36, wherein the file is caused to open when the Internet browser is activated so as to establish a link between the computer and the predetermined Internet site, and wherein the file receives information from the predetermined Internet site for defining all or part of an interface object to be displayed within the user toolbar.

38. A system as recited by claim 37, wherein the file periodically causes the Internet browser to establish a link between the computer and the predetermined Internet site and receive additional information from the predetermined Internet site for defining all or part of the interface object.

39. The system of claim 36 wherein the user toolbar comprises a button via which the user can establish a connection to an email service.

40. The system of claim 36 wherein the user toolbar comprises a button via which the user can access a list of said user's favorite websites.

41. The system of claim 36 wherein the user toolbar comprises a button via which the user can access a list of user addresses.

42. The system of claim 37 wherein the user toolbar comprises an advertisement.

43. A system for controlling an Internet browser user interface displayed by an Internet browser on a display of a computer, said system comprising:
   a server, said server including a program accessible over the Internet by a user of the computer for controlling the Internet browser interface; and
   a file downloadable by said server to the computer for controlling the Internet browser user interface in the form of an added user toolbar visibly displayed as part of the Internet browser user interface of the Internet browser, and offering user toolbar functionality not present in the browser prior to download, the user toolbar displayed within the bounds of the Internet browser user interface such that the user toolbar does not overlay the web page display area or the Internet browser user interface, the user toolbar remaining available to a user of the computer regardless of the Internet site to which the Internet browser is caused to navigate.

44. A system as recited by claim 43, wherein said downloadable file causes a user toolbar to be displayed on the display of the computer as part of the Internet browser interface.

45. A system as recited by claim 44, wherein said downloadable file causes an interface object to be displayed as part of said user toolbar.

46. A system as recited by claim 45, wherein said interface object enables a user of the computer to customize the user toolbar and comprises an ActiveX control.

47. A system as recited by claim 45, wherein said interface object enables a user of the computer to customize the user toolbar and comprises a Plug-in.

48. A system as recited by claim 45, wherein said interface object is a toolbar button.

49. A system as recited by claim 45, wherein said interface object is a search window that enables a user of the computer and Internet browser to initiate a search at a predetermined Internet site regardless of the Internet site to which the computer is connected via the browser at the time the search is initiated.

* * * * *